United States Patent
Osako

(10) Patent No.: US 9,108,112 B2
(45) Date of Patent: Aug. 18, 2015

(54) GAME SYSTEM, GAME APPARATUS, STORAGE MEDIUM, AND GAME CONTROLLING METHOD FOR GAME PLAY USING A PLURALITY OF GAME APPARATUSES

(75) Inventor: Satoru Osako, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 93 days.

(21) Appl. No.: 13/370,781

(22) Filed: Feb. 10, 2012

(65) Prior Publication Data

US 2013/0143667 A1    Jun. 6, 2013

(30) Foreign Application Priority Data

Dec. 1, 2011   (JP) ................................ 2011-263361

(51) Int. Cl.
| | |
|---|---|
| A63F 13/00 | (2014.01) |
| A63F 9/24 | (2006.01) |
| A63F 13/34 | (2014.01) |
| H04L 29/06 | (2006.01) |
| A63F 13/35 | (2014.01) |
| A63F 13/30 | (2014.01) |

(52) U.S. Cl.
CPC ............... *A63F 13/34* (2014.09); *A63F 13/12* (2013.01); *A63F 13/35* (2014.09); *H04L 29/06034* (2013.01); *A63F 2300/513* (2013.01); *A63F 2300/531* (2013.01)

(58) Field of Classification Search
CPC ......... A63F 13/00; A63F 13/12; A63F 13/30; A63F 13/32; A63F 13/323; A63F 13/327; A63F 13/33; A63F 13/332; A63F 13/335; A63F 13/34; A63F 13/35; A63F 13/45; A63F 13/70; A63F 2300/40; A63F 2300/407; A63F 2300/408; A63F 2300/50; A63F 2300/51; A63F 2300/513; A63F 2300/53; A63F 2300/532; A63F 2300/538; A63F 2300/55; H04L 29/06034
USPC .............. 463/40–43; 709/203, 209–211, 232; 380/251
See application file for complete search history.

(56) References Cited

U.S. PATENT DOCUMENTS

| | | | |
|---|---|---|---|
| 5,098,110 A * | 3/1992 | Yang ............................... 463/39 |
| 7,031,473 B2 * | 4/2006 | Morais et al. ................. 380/251 |
| 8,276,084 B2 * | 9/2012 | Castelli et al. ................ 715/757 |
| 2002/0068632 A1 * | 6/2002 | Dunlap .......................... 463/42 |
| 2002/0071557 A1 * | 6/2002 | Nguyen ........................ 380/251 |
| 2002/0103019 A1 * | 8/2002 | Emmerson ...................... 463/16 |
| 2002/0187828 A1 * | 12/2002 | Benbrahim ..................... 463/29 |
| 2003/0014639 A1 * | 1/2003 | Jackson et al. ................ 713/181 |

(Continued)

FOREIGN PATENT DOCUMENTS

JP       2011-078634       4/2011

*Primary Examiner* — Milap Shah
(74) *Attorney, Agent, or Firm* — Nixon & Vanderhye, P.C.

(57) ABSTRACT

An example of a game system includes a plurality of game apparatuses, and a matching server decides game apparatuses as players (A, B), and game apparatuses as game masters (C-E) in response to a request from the game apparatus. During the game play, operation data in response to an operation input to each of the game apparatuses (A, B) is transmitted to the game apparatuses (C-E), and in the game apparatuses (C-E), game processing is executed. Result data of the game processing is transmitted to the game apparatuses (A, B). When the data is saved, the encoded game data is transmitted from each of the game apparatuses (C-E) to the game apparatuses (A, B), and saved there.

17 Claims, 24 Drawing Sheets

(56) References Cited

U.S. PATENT DOCUMENTS

| | | | |
|---|---|---|---|
| 2003/0054879 A1* | 3/2003 | Schneier et al. | 463/29 |
| 2003/0216178 A1* | 11/2003 | Danieli et al. | 463/35 |
| 2004/0064320 A1* | 4/2004 | Chrysanthakopoulos et al. | 704/275 |
| 2004/0224740 A1* | 11/2004 | Ball et al. | 463/6 |
| 2004/0259640 A1* | 12/2004 | Gentles et al. | 463/42 |
| 2005/0077995 A1* | 4/2005 | Paulsen et al. | 340/5.6 |
| 2005/0282637 A1* | 12/2005 | Gatto et al. | 463/42 |
| 2006/0004874 A1* | 1/2006 | Hutcheson et al. | 707/104.1 |
| 2006/0160623 A1* | 7/2006 | Lee | 463/42 |
| 2007/0259717 A1* | 11/2007 | Mattice et al. | 463/36 |
| 2007/0293319 A1* | 12/2007 | Stamper et al. | 463/42 |
| 2008/0039205 A1* | 2/2008 | Ackley et al. | 463/40 |
| 2008/0182661 A1* | 7/2008 | Korp | 463/31 |
| 2008/0214300 A1* | 9/2008 | Williams et al. | 463/29 |
| 2009/0325685 A1* | 12/2009 | Webb et al. | 463/25 |
| 2010/0122320 A1* | 5/2010 | Merati et al. | 726/3 |
| 2010/0273552 A1* | 10/2010 | Kang | 463/29 |

\* cited by examiner

GAME SYSTEM, GAME APPARATUS, STORAGE MEDIUM, AND GAME CONTROLLING METHOD FOR GAME PLAY USING A PLURALITY OF GAME APPARATUSES

CROSS REFERENCE OF RELATED APPLICATION

The disclosure of Japanese Patent Application No. 2011-263361 filed on Dec. 1, 2011 is incorporated herein by reference.

FIELD

The present embodiment relates to a game system, a game apparatus, a storage medium and a game controlling method. More specifically, the present invention relates to a game system, game apparatus, storage medium and game controlling method that plays a communication game.

SUMMARY

It is a primary object of the present embodiment to provide a novel game system, game apparatus, storage medium and game controlling method.

Another object of the present embodiment is to provide a game system, a game apparatus, a game program and a game controlling method that are able to prevent an illegal act from occurring as much as possible without management of game data in other devices.

A first embodiment is a game system including a first game apparatus and a second game apparatus being connectable to each other on a network. The first game apparatus comprises a storage which stores encoded game data obtained by encoding game data for playing a game in the first game apparatus, and a first encoded data transmitter which transmits the encoded game data stored by the storage to the second game apparatus. The second game apparatus comprises a game data acquirer which acquires the game data obtained by decoding the encoded game data transmitted by the first encoded data transmitter, in place of the first game apparatus.

According to the first embodiment, one game apparatus stores the encoded game data obtained by encoding the game data for playing the game in the game apparatus while the other game apparatus acquires the decoded game data, and therefore, the game apparatus which plays the game cannot make direct access to raw game data. Accordingly, the game data need not be managed in devices other than the game apparatuses, and therefore, it is possible to prevent an illegal act from occurring as much as possible.

A second embodiment is according to the first embodiment, wherein the second game apparatus further comprises a game processing executer which executes game processing on the basis of the game data acquired by the game data acquirer. That is, the second game apparatus executes the game processing relative to game playing of the first game apparatus on the basis of the decoded game data.

According to the second embodiment, the game processing is performed in the game apparatus other than the game apparatus which plays the game, and therefore, it is possible to prevent an illegal act in the game apparatus which plays the game.

A third embodiment is according to the second embodiment, wherein the first game apparatus further comprises an input data transmitter which transmits, in response to an input by a user, input data corresponding to the input to the second game apparatus. The game processing executer executes the game processing on the basis of the input data transmitted by the input data transmitter and the game data acquired by the game data acquirer. That is, the second game apparatus executes the game processing according to the input data from the first game apparatus by using the decoded game data.

According to the third embodiment, game processing is executed according to the input by the user of the first game apparatus, and therefore, it is possible to reflect the input by the user on the result of the game processing.

A fourth embodiment is according to the first embodiment, wherein the game system further includes a decoding device which is connectable to at least the second game apparatus. The second game apparatus further comprises a second encoded data transmitter which transmits the encoded game data transmitted by the first encoded data transmitter to the decoding device. The decoding device comprises a decoder which decodes the encoded game data transmitted by the second encoded data transmitter, and a first game data transmitter which transmits the game data obtained by being decoded by the decoder to the second game apparatus. The game data acquirer receives the game data transmitted by the first game data transmitter. That is, the decoding device decodes the encoded game data at the request of the second game apparatus, and transmits the decoded game data to the second game apparatus being the source of the request.

According to the fourth embodiment, in the first game apparatus which plays the game, the encoded game data is stored, and prior to starting of the game, for example, the encoded game data is decoded by the decoding device at the request of the second game apparatus, and therefore, it is possible to prevent the game data from being modified (tampered) as much as possible without preparing other devices for storing the game data.

A fifth embodiment is according to the fourth embodiment, and the game system further includes a first matcher which decides at least the first game apparatus and the second game apparatus in a case that encoded game data is transmitted by the first encoded data transmitter. The decoder decodes the encoded game data in a case that a combination of the first game apparatus and the second game apparatus which play the game according to game data corresponding to the encoded game data transmitted by the second encoded data transmitter is decided by the first matcher.

According to the fifth embodiment, in a case that a request from the second game apparatus which is correctly combined with the first game apparatus is issued, the encoded game data is decoded, and therefore, it is possible to prevent unauthorizedly created encoded game data from being decoded, or the encoded game data from being decoded at the request of the game apparatus which is not correctly combined.

A sixth embodiment is according to the second embodiment, wherein the second game apparatus further comprises an encoded data acquirer which acquires encoded game data obtained by encoding the game data to be changed as a result of the game processing executed by the game processing executer, and a third encoded data transmitter which transmits the encoded game data acquired by the encoded data acquirer to the first game apparatus. The storage stores the encoded game data transmitted by the third encoded data transmitter. That is, the second game apparatus executes the game processing relative to the game playing of the first game apparatus, acquires encoded game data obtained by encoding the game data changed according to the game playing while the first game apparatus saves the encoded game data.

According to the sixth embodiment, in a case of playing the game, the encoded game data obtained by encoding the game data updated according to the game playing is saved, it is possible to prevent the first game apparatus from directly accessing the game data.

A seventh embodiment is according to the sixth embodiment, wherein the game system further includes an encoding device which is connectable to at least the second game apparatus. The second game apparatus further comprises a second game data transmitter which transmits the game data to the encoding device. That is, the second game apparatus requests other devices, such as an encoding device to encode the game data. The encoding device further comprises an encoder which encodes the game data transmitted by the second game data transmitter, and a fourth encoded data transmitter which transmits encoded game data encoded by the encoder to the second game apparatus. The encoded data acquirer receives the encoded game data transmitted by the fourth encoded data transmitter. The encoding device encodes the game data in a format decodable by the decoding device at the request of the second game apparatus, and transmits the encoded game data to the second game apparatus. The first game apparatus acquires the encoded game data and then saves it.

According to the seventh embodiment, the game data is encoded by the encoding device, and therefore, if the format, or the like of the encoding is not opened, it is possible to prevent the encoded game data from being decoded or modified (tampered) as much as possible.

An eighth embodiment is according to the seventh embodiment, and the game system further includes a second matcher which decides at least the first game apparatus and the second game apparatus in a case that the encoded game data is transmitted by the first encoded data transmitter. The encoder encodes the game data in a case that a combination of the first game apparatus and the second game apparatus which play the game according to the game data transmitted by the first game data transmitter is decided by the second matcher.

According to the eighth embodiment, in a case that a request for encoding is issued from the second game apparatus which is correctly combined with the first game apparatus, the encoding device encodes the game data, and therefore, encoding of the modified or tampered game data and encoding at the request of the game apparatus which is not correctly combined hardly occur. Accordingly, if the game is played thereafter, it is possible to prevent unauthorized game data from being used as much as possible.

A ninth embodiment is according to the sixth embodiment, wherein the game system further includes a plurality of second game apparatuses, and the storage stores (saves) proper encoded game data out of a plurality of sets of encoded game data transmitted by the fourth encoded data transmitter of a plurality of second game apparatuses.

According to the ninth embodiment, the proper encoded game data is saved, and therefore, even if an illegal act is performed in a part of the second game apparatuses, when game playing is performed thereafter, it is possible to use the game data on which an illegal act is not performed.

A tenth embodiment is according to the ninth embodiment, wherein a game system includes at least three second game apparatuses. The storage compares the plurality of sets of the encoded game data transmitted by the fourth encoded data transmitter of the plurality of second game apparatuses, and stores the encoded game data which is identical and the largest in number, out of the plurality of set of the encoded game data. That is, based on majority rule, proper encoded game data is selected (decided) and saved.

According to the tenth embodiment, based on a simple method like a majority rule, it is possible to decide proper encoded game data.

An eleventh embodiment is a game apparatus being connectable to other game apparatus of the same type on a network, comprising a storage which stores encoded game data obtained by encoding game data for playing a game; an encoded data transmitter which transmits the encoded game data stored by the storage to the other game apparatus; an input data transmitter which transmits, in response to an input by the user, input data corresponding to the input to the other game apparatus; and an output controller which outputs to an output device result data of game processing based on the game data obtained by decoding the encoded game data and the input data.

A twelfth embodiment is a storage medium storing a game program of a game apparatus having a storage which stores encoded game data obtained by encoding game data for playing a game, and being connectable to another game apparatus of the same type on a network, the game program causes a computer of the game apparatus to function as an encoded data transmitter which transmits the encoded game data stored by the storage to the other game apparatus; an input data transmitter which transmits, in response to an input by the user, input data corresponding to the input to the other game apparatus; and an output controller which outputs to an output device result data of game processing based on the game data obtained by decoding the encoded game data and the input data.

A thirteenth embodiment is a game controlling method of a game apparatus having a storage which stores encoded game data obtained by encoding game data for playing a game, and being connectable to another game apparatus of the same type on a network, a computer of the game apparatus comprising: (a) transmitting the encoded game data stored by the storage to the other game apparatus, (b) transmitting, in response to an input by the user, input data corresponding to the input to the other game apparatus, and (c) outputting to an output device result data of game processing based on the game data obtained by decoding the encoded game data and the input data.

In the eleventh to thirteenth embodiments as well, similar to the first embodiment, the game data need not be managed in devices other than the game apparatuses, and therefore, it is possible to prevent the illegal act from occurring as much as possible.

A fourteenth embodiment is a game system in which a first game apparatus, a second game apparatus and a third game apparatus being connectable to each other on a network are included, and a communication game is played between the first game apparatus and the second game apparatus. The first game apparatus comprises a first storage which stores first encoded game data obtained by encoding first game data for playing the communication game, and a first encoded data transmitter which transmits the first encoded game data stored by the first storage to the third game apparatus. The second game apparatus comprises a second storage which stores second encoded game data obtained by encoding second game data for playing the communication game, and a second encoded data transmitter which transmits the second encoded game data stored by the second storage to the third game apparatus. The third game apparatus comprises a game data acquirer which acquires the first game data obtained by decoding the first encoded game data transmitted by the first encoded data transmitter and the second game data obtained by decoding the second encoded game data transmitted by the second encoded data transmitter, a game processing executer which executes game processing on the basis of the first game data and the second game data that are acquired by the game data acquirer, and a result data transmitter which transmits result data of the game processing executed by the game processing executer to the first game apparatus and the second game apparatus. Each of the first and second game apparatuses further comprises an output controller which outputs the result data transmitted by the result data transmitter to an output device.

According to the fourteenth embodiment, in a case that the communication game is played between the first game apparatus and the second game as well, the third game apparatus merely acquires the game data obtained by decoding the encoded game data stored in the respective apparatuses, executes the game processing, and transmits the result data to the first game apparatus and the second game apparatus, and therefore, the first game apparatus and the second game apparatus never access the game data about the communication game to be played between them. Thus, in the fourteenth embodiment as well, similar to the first embodiment, the game data need not be managed in devices other than the game apparatuses, and therefore, it is possible to prevent the illegal act from occurring as much as possible.

The above described objects and other objects, features, aspects and advantages of the present embodiment will become more apparent from the following detailed description of the present embodiment when taken in conjunction with the accompanying drawings.

DETAILED DESCRIPTION OF NON-LIMITING EXAMPLE EMBODIMENTS

Figure 1:
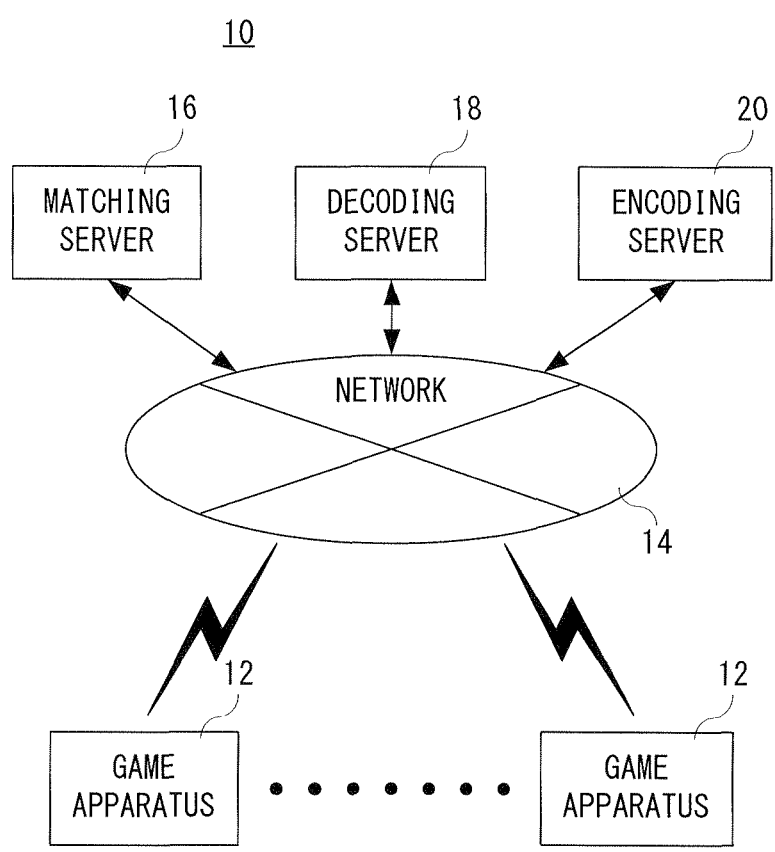
FIG. 1 shows an example non-limiting game system of the present embodiment.

Referring to FIG. 1, a game system 10 of the present non-limiting example embodiment includes a plurality of game apparatuses 12, and each of the plurality of game apparatuses 12 is connected to a matching server 16, a decoding server 18 and an encoding server 20 via a network 14 so as to make communications with each other.

Figure 2:
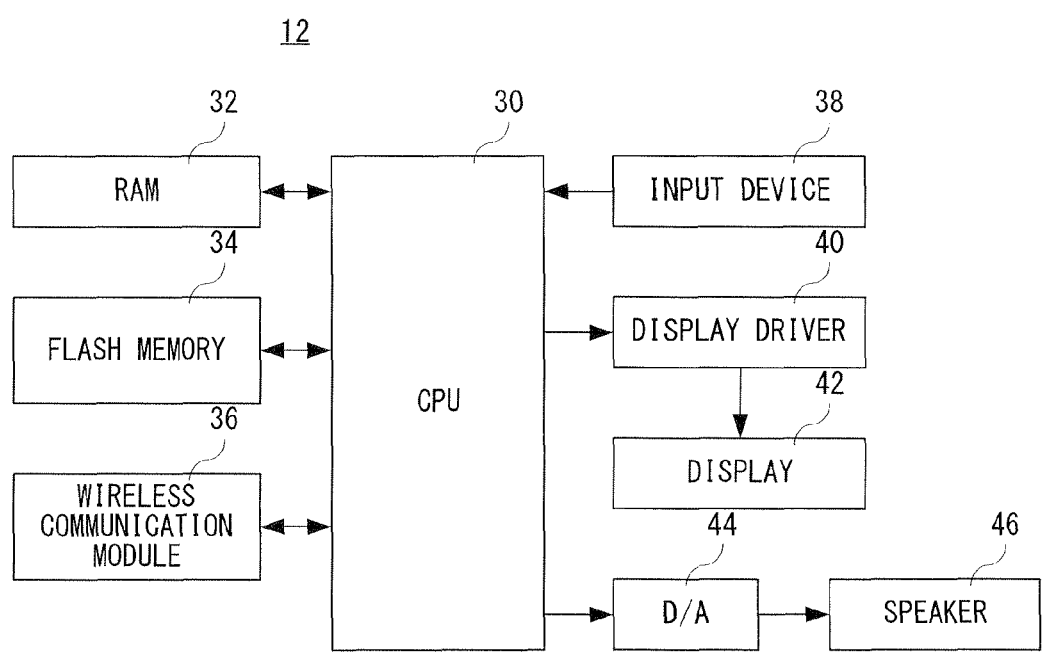
FIG. 2 is a block diagram showing an example non-limiting electric configuration of the game apparatus shown in FIG. 1.

FIG. 2 is a block diagram showing an example non-limiting electric configuration of the game apparatus 12 shown in FIG. 1. As shown in FIG. 2, the game apparatus 12 includes a CPU 30, and the CPU 30 is connected with a RAM 32, a flash memory 34, a wireless communication module 36, an input device 38, a display driver 40 and a D/A converter 44. Also, the display driver 40 is connected with a display 42, and the D/A converter 44 is connected with a speaker 46.

The CPU 30 entirely controls the game apparatus 12. The RAM 32 is used as a working memory and a buffer memory of the CPU 30. The flash memory 34 is used for storing (saving) application programs such as a game, and various sets of data.

The wireless communication module 36 has a function of connecting to a wireless LAN. Accordingly, the game apparatus 12 can communicate with other game apparatuses 12 and computers (server 16, 18, 20, etc.) directly or over the network 14.

The input device 38 is various push buttons or switches that are provided to the game apparatus 10, for example, and is used for various operations, such as selecting options from a menu, a game operation, etc. Here, as an input device 38, an inputter, such as a pointing device like a touch panel, etc., a microphone, a camera, etc. may be provided in place of the push buttons or the switches, or together with the push buttons or the switches.

The display driver 40 is used for displaying various images such as game images on the display 42 under an instruction of the CPU 30. Although illustration is omitted, the display driver 40 contains a video RAM (VRAM).

The D/A converter 44 converts audio data applied from the CPU 30 to an analog game voice, and outputs it to the speaker 46. Here, the game sounds means sound necessary for the game, such as onomatopoeic sound of game characters, sound effects, music (BGM).

It should be noted that the electric configuration of the game apparatus 12 as shown in FIG. 2 is merely one example, and there is no need of being restricted thereto.

Although the illustration and detailed description are omitted, the matching server 16, the decoding server 18 and the encoding server 20 that are shown in FIG. 1 are general-purpose servers, and each includes components, such as a processor like a CPU, a memory (HDD, ROM, RAM, etc.), a communication module, etc. The reason why the decoding server 18 and the encoding server 20 are provided is that by decoding and encoding with devices other than the game apparatuses 12, it is possible to prevent the encoded game data from being unauthorizedly decoded by game apparatuses 12 as described later. Accordingly, the encoding format can employs arbitrary formats, but the formats, etc. are not opened.

In such a game system 10, the matching server 16 accepts a participation request from each game apparatus 12, decides some game apparatuses 12 as players to play the communication game, and decides other game apparatuses 12 as game masters of the communication game. Here, in this embodiment, the game apparatus 12 (CPU 30, or the like) can execute processing as a player and processing as a game master of different two communication games (groups). Accordingly, the game apparatus 12 can participate in a communication game of a certain group as a player and in communication games of the other groups as a game master. Although the detailed description is omitted, the communication games in which the game apparatus 12 participates as a player and participates as a game master may be the same type or different types.

For example, the game apparatuses 12 of users which are similar in game level (experience point) and total playing minute are decided as game apparatuses 12 as players (may be referred to as being subject to matching in this embodiment). Here, the game level (experience point) and the total playing minute are managed by the matching server 16 for each user (game apparatus 12). Furthermore, the game apparatuses 12 which are other than the game apparatuses 12 decided as players and are not assigned the game masters of the two groups or a backup node described later are decided as game apparatuses 12 as game masters (may be referred to as being subject to matching in this embodiment). Hereafter, in a case that the game apparatus 12 functions as game masters in the two groups, the game master relative to the one group is called a "first game master", and the game master relative to the other group is called a "second game master".

Additionally, the matching server 16 manages the game apparatuses 12 decided as players and the game apparatuses 12 decided as game masters as one group. In this embodiment, a terminal list of each group is generated, and stored in the memory. In the terminal list, in correspondence with the identification information of the game apparatus 12, the connection information of the game apparatus 12 and discrimination between a player and a game master (kind) are described. In this embodiment, the identification information and the connection information of the game apparatus 12 are collectively referred as terminal information hereafter.

For example, the identification information of the game apparatus 12 is an MAC address of the wireless communication module contained in the game apparatus 12, specific identification symbol given to the game apparatus 12, a name (user name, etc.) given to the game apparatus 12, etc. Furthermore, the connection information of the game apparatus 12 is an IP address assigned to the game apparatus 12.

In the matching server 16, such groups are generated depending on the number of game apparatuses 12 from which a participation request is issued. Hereafter, focusing on one group, description is made on game processing, etc. in this embodiment, but this holds true for other groups.

In this embodiment, the game apparatus 12 as a game master means a game apparatus 12 the same type as the game apparatus 12 as a player, and a game apparatus 12 that mainly performs game processing on the basis of operation data from the game apparatuses 12 as players that play the communication game in which the game apparatus 12 as game master itself does not participate. Furthermore, in this embodiment, the game apparatus 12 as a game master requests the decoding server 18 to decode the save data (encoded game data) transmitted from the game apparatuses 12 as players prior to the start of the communication game, and requests the encoding server 20 to encode the game data generated by the game processing according to an instruction form the game apparatuses 12 as players.

It should be noted that in this embodiment, the matching server 16 decides the game apparatuses 12 as players and game apparatuses 12 as game masters, but the game apparatuses 12 as players and the game apparatuses 12 as game masters may be decided by different servers. Here, the game apparatuses 12 as players and the game apparatuses 12 as game masters are brought into correspondence with each other such that they are managed as one group.

Figure 3:
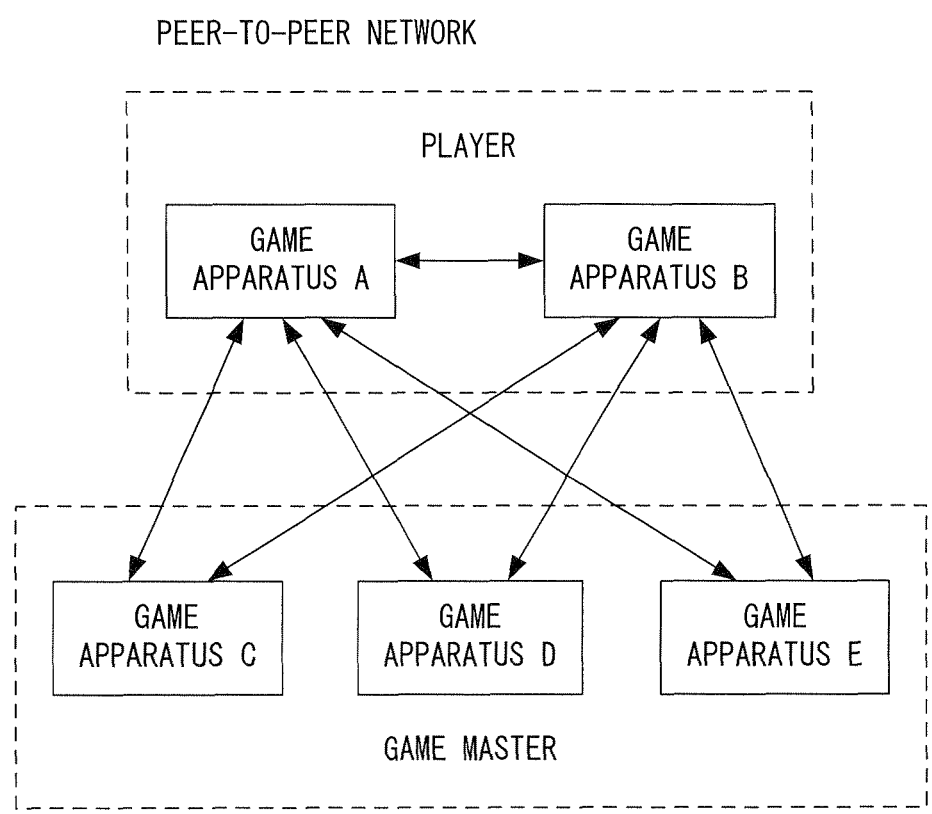
FIG. 3 shows an example non-limiting peer-to-peer network making up of game apparatuses decided as players and as game masters in a case that a communication game is played.

In this embodiment, in one group, two game apparatuses 12 are decided as players, and three game apparatuses 12 are decided as game masters in association with them. Then, by the game apparatuses 12 as players and the game apparatuses 12 as game masters which make up of one group, a peer-to-peer network as shown in FIG. 3 is built. Hereinafter, in this embodiment, in a case that the game apparatuses 12 are differentiated from one another, the two game apparatuses 12 as players are called a game apparatus A and a game apparatus B, and the three game apparatuses 12 as game masters are called a game apparatus C, a game apparatus D and a game apparatus E.

Thus, when the game apparatuses 12 as players and the game apparatuses 12 as game masters are decided to build the peer-to-peer network, game playing processing is executed among the decided game apparatuses 12. Accordingly, it is possible to distribute the load of the game processing without preparing a game server.

Also, the game playing processing is executed in the decided game apparatuses 12, and thus, when the matching server 16 creates a terminal list, it transmits the created terminal list to each of the game apparatuses 12 in the group. Accordingly, each game apparatus 12 stores the terminal list.

In this embodiment, the game apparatus 12 stores the game data relating to the communication game in an encoded manner. However, game data (hereinafter referred to as "encoded game data")) encoded in a format that cannot be decoded by the game apparatus 12 is stored (saved). This is because of preventing raw game data (plain text) from being modified (tampered) by a user of the game apparatus 12. Accordingly, in this embodiment, the game data that is decoded is stored in the game apparatuses 12 as game masters, and each of the game apparatuses 12 as game masters executes game processing on the basis of the operation data from the game apparatuses 12 as players. That is, each of the game apparatuses 12 as game masters executes game processing according to operation data from the game apparatuses 12 as players by using the game data. Then, result of the processing (result data) is transmitted to the game apparatuses 12 as players.

It should be noted that if the encoded game data is tampered, this cannot be decoded by a decoding device (decoding server 18 in this embodiment), and thus, it is almost impossible to perform the game processing according to unauthorized game data.

In this embodiment, the game data is parameter data (kind, power, strength, quickness, etc.) as to player characters and possessed items, etc., and it does not include operation data. However, the game data need not be restricted to it and, and is data capable of advancing the communication game advantageously or disadvantageously by being modified (tampered).

Accordingly, in a case that encoded game data, that is, save data is stored in the game apparatuses 12 as players, the data loading processing is executed prior to start of the communication game. This data loading processing is executed by the game apparatuses 12 as players (A, B), the game apparatuses 12 as game masters (C-E), the matching server 16 and the decoding server 18.

It should be noted that in a case that the communication game is first played, the save data is not stored, and thus, game data based on initial values (default value) is stored in the game apparatuses 12 as game masters (C-E) without execution of the data loading processing.

Figure 4:
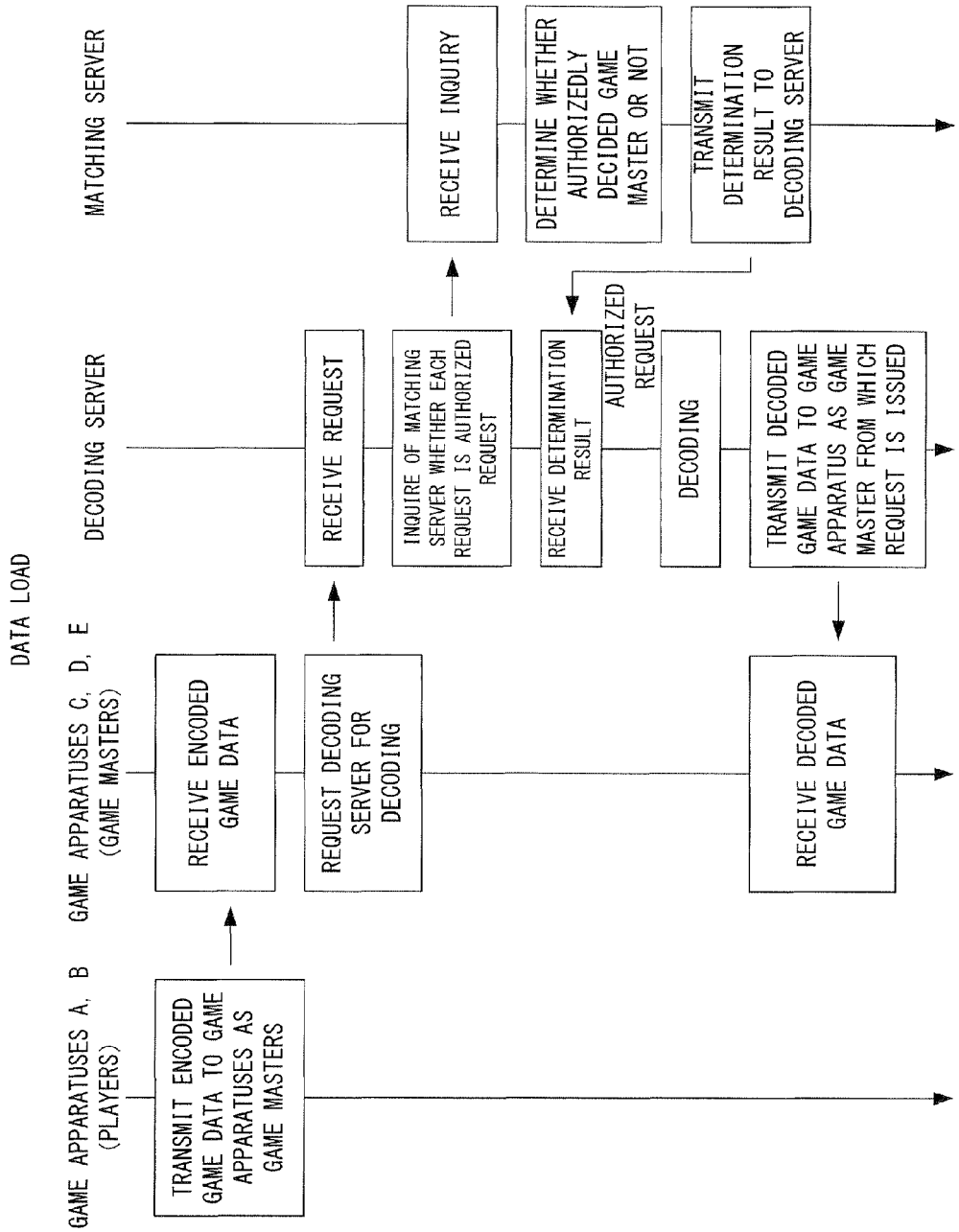
FIG. 4 shows an example non-limiting rough flows of processing by game apparatuses as players, game apparatuses as game masters, a decoding server and a matching server in a case that data is loaded.

As shown in FIG. 4, the game apparatuses A, B as players transmit the save data (encoded game data) to each of the game apparatuses C-E as game masters. Hereinafter, the encoded game data stored in the game apparatus A may be called "encoded game data A", and the encoded game data stored in the game apparatus B may be called "encoded game data B".

Here, to the encoded game data, identification information of the game apparatuses A, B storing it is added as header information (meta information).

Each of the game apparatuses C-E as game masters receives the encoded game data A and receives the encoded game data B. Next, each of the game apparatuses C-E requests to decode the encoded game data A, and requests to decode the encoded game data B. More specifically, each of game apparatuses C-E transmits the request for decoding and the encoded game data A to the decoding server 18, and transmits the request for decoding and the encoded game data B to the decoding server 18.

Here, the game apparatuses C-E as game masters need not simultaneously receive the encoded game data A and the encoded game data B and need not simultaneously request for decoding.

The decoding server 18 inquires of the matching server 16 whether the each of the requests from the game apparatuses C-E as game masters is an authorized request. It should be noted that the inquiry is made for each request. More specifically, the decoding server 18 acquires terminal information (hereinafter referred to as "player terminal information", for convenience of explanation) of the game apparatus 12 as a player from the meta information of the encoded game data, acquires terminal information of the source of the request for decoding (hereinafter referred to as "source of the request for decoding terminal information" for convenience of explanation), and transmits an inquiry including the player terminal information and the source of the request for decoding terminal information to the matching server 16.

When the matching server 16 receives the request, it determines whether an authorizedly decided game master or not. That is, the combination between the game apparatuses 12 as players and the game apparatuses 12 as game masters is correct. More specifically, the matching server 16 determines whether or not the game apparatus 12 indicated by the player terminal information and the game apparatus 12 indicated by the source of the request for decoding terminal information belong to the same group, the game apparatus 12 indicated by the player terminal information is decided as a player, and the game apparatus 12 indicated by the source of the request for decoding terminal information is decided as a game master. Then, the matching server 16 transmits the determination result to the decoding server 18.

The decoding server 18 receives the determination result, decodes the encoded game data if the request is from the authorizedly decided game master, and transmits the decoded game data to the game apparatus 12 as a game master being a source of the request for decoding.

Accordingly, the game apparatus 12 as a game master being a source of the request for decoding receives the decoded game data, and stores it in the RAM 32. Thus, the authorizedly decided game apparatus 12 as a game master acquires the game data on the game apparatus A as a player and the game data on the game apparatus B as a player. That is, in place of the game apparatus 12 as a player, the game apparatus 12 as a game master acquires the game data obtained by decoding the encoded game data transmitted from the game apparatus 12 as a player. Hereinafter, for convenience of explanation, the game data obtained by decoding the encoded game data A is referred to as "game data A", and the game data obtained by decoding the encoded game data B is referred to as "game data B".

When the data loading processing is ended, the communication game is started. When the communication game is started, the game playing processing is performed by the game apparatuses A, B as players and the game apparatuses C-E as game masters.

Figure 5:
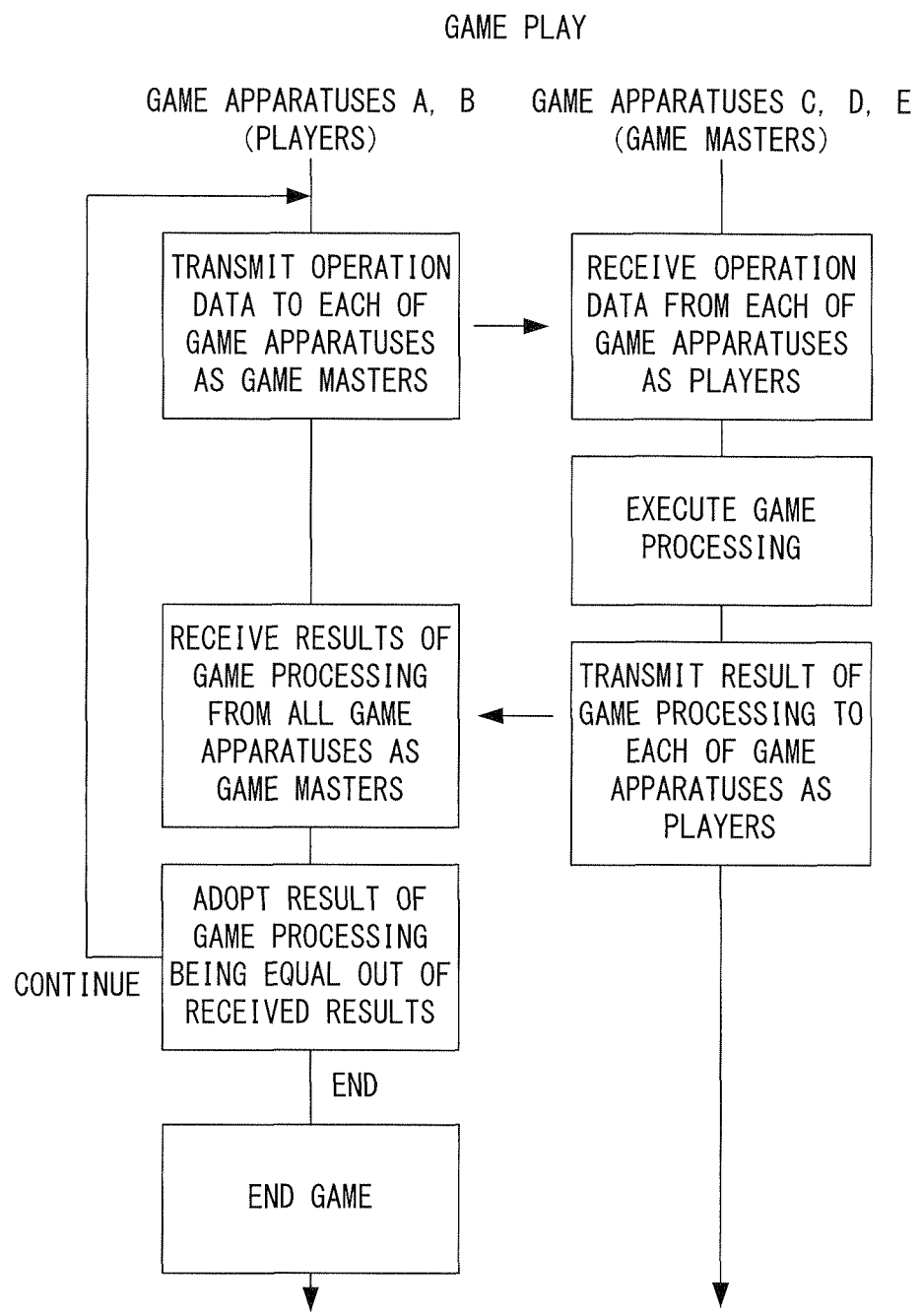
FIG. 5 shows an example non-limiting rough flows of processing by the game apparatuses as players and the game apparatuses as game masters in a case that a communication game is played.

As shown in FIG. 5, in the game playing processing, operation data in response to an operation input to the game apparatus A as a player (hereinafter referred to as "operation data A" for convenience of explanation) is transmitted to each of the game apparatuses C-E, and operation data in response to an operation input to the game apparatus B as a player (hereinafter referred to as "operation data B" for convenience of explanation) is transmitted to each of the game apparatuses C-E.

When each of the game apparatuses C-E as game masters receives both of the operation data A and the operation data B, it executes the game processing of the communication game by using the game data A and the game data B according to the operation data A and the operation data B. Then, the result of the game processing (result data) is transmitted to each of the game apparatus A as a player and the game apparatus as a player B.

It should be noted that each of the game apparatuses C-E as game masters stores the game program for executing the game processing of the communication game to be executed between the game apparatuses A, B as players in advance. For example, the game program for executing the game processing of the communication game to be executed between the game apparatuses A, B as players is downloaded from the matching server 16.

Each of the game apparatuses A and B receives the result data, and outputs the result data. For example, each of the game apparatuses A and B depicts (updates) and outputs (displays) game images on the basis of the result data, and generates and outputs game sounds. Here, as described above, the game apparatus 12 as a player transmits the operation data to all the game apparatuses 12 as game masters, all the game apparatuses 12 as game masters execute the game processing, and then, the game apparatus 12 as a player receives the result data from each of all the game apparatuses 12 as game masters. Thus, the game apparatus 12 as a player adopts and outputs proper result data from all the received sets of result data (three, here). In this embodiment, out of the three sets of result data, the result data being identical is adopted as proper result data. That is, based on majority rule, the result data to be output is decided.

The reason why the result data being identical is adopted and output is that although the game apparatus 12 as a game master is an authorizedly decided, but the game apparatus 12 as a game master can access the raw game data of the game apparatus 12 as a player in the communication game in which it is in charge of the game processing, and thus can modify (tamper) it. Thus, by adopting one result data based on majority rule as described above, it is possible to prevent the result data of the game processing performed based on the unauthorized game data from being reflected on the communication game as much as possible. Due to this, it is possible to avoid an illegal act such as hindering other's communication game. Also, the reason why the result data to be adopted based on majority rule is decided is that it is considered that such illegal act is performed by a few users. This holds true for deciding the encoded game data described later based on majority rule.

Before the game is ended, the aforementioned processing is repeatedly executed. In response to occurrence of a predetermined event during the game, an input of an instruction by the player during the game, or the game end, data saving processing is executed. The data saving processing is executed by the game apparatuses A, B as players, the game apparatuses C-E as game masters, the matching server 16 and the encoding server 20.

Figure 6:
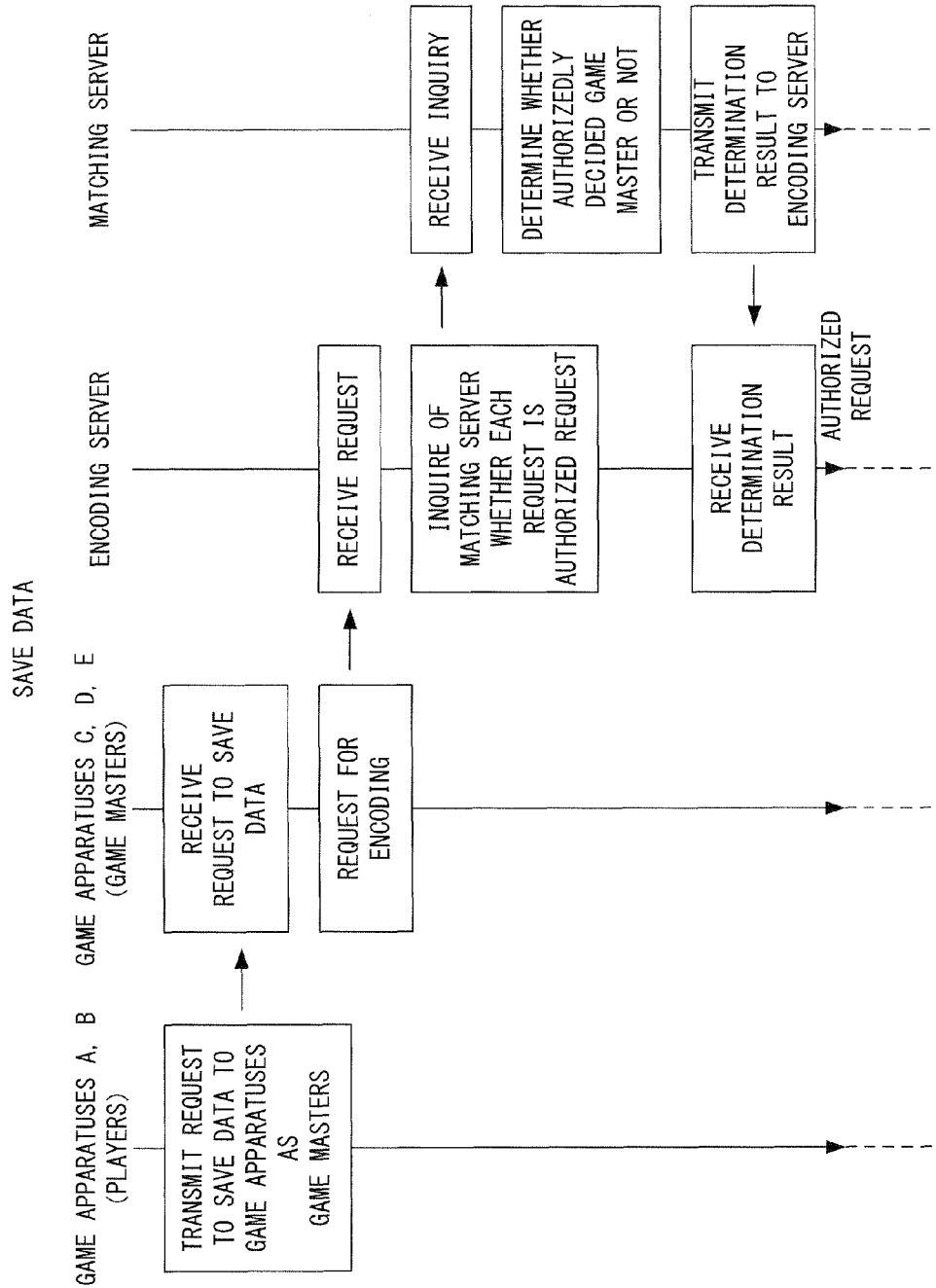
FIG. 6 shows an example non-limiting part of rough flows of processing by the game apparatuses as players, the game apparatuses as game masters, an encoding server and the matching server in a case that data is saved.

More specifically, as shown in FIG. 6, each of the game apparatuses A, B as players requests the game apparatuses C-E as game masters to save data.

When each of the game apparatuses C-E as game masters receives a request to save data, it requests the encoding server 20 to encode the game data. More specifically, each of the game apparatuses C-E as game masters transmits the request for encoding and the game data on the game apparatus 12 as a player being a source of the request to the encoding server 20. Here, to the game data, the identification information of the game apparatus A or the game apparatus B is added as header information (meta information).

When the encoding server 20 receives the request for encoding and the game data, it inquires of the matching server 16 whether the request is an authorized request. More specifically, the encoding server 20 acquires the player terminal information from the meta information of the game data and the terminal information of the source of the request for encoding (hereinafter referred to as "source of the request for encoding terminal information" for convenience of explanation), and transmits an inquiry including the player terminal information and the source of the request for encoding terminal information to the matching server 16.

When the matching server 16 receives the inquiry, it determines whether or not the request is from the authorizedly decided game master. More specifically, the matching server 16 determines whether or not the game apparatus 12 indicated by the player terminal information and the game apparatus 12 indicated by the source of the request for encoding terminal information belong to the same group, the game apparatus 12 indicated by the player terminal information is decided as a player, and the game apparatus 12 indicated by the source of the request for encoding terminal information is decided as a game master. Then, the matching server 16 transmits the determination result to the encoding server 20.

Figure 7:
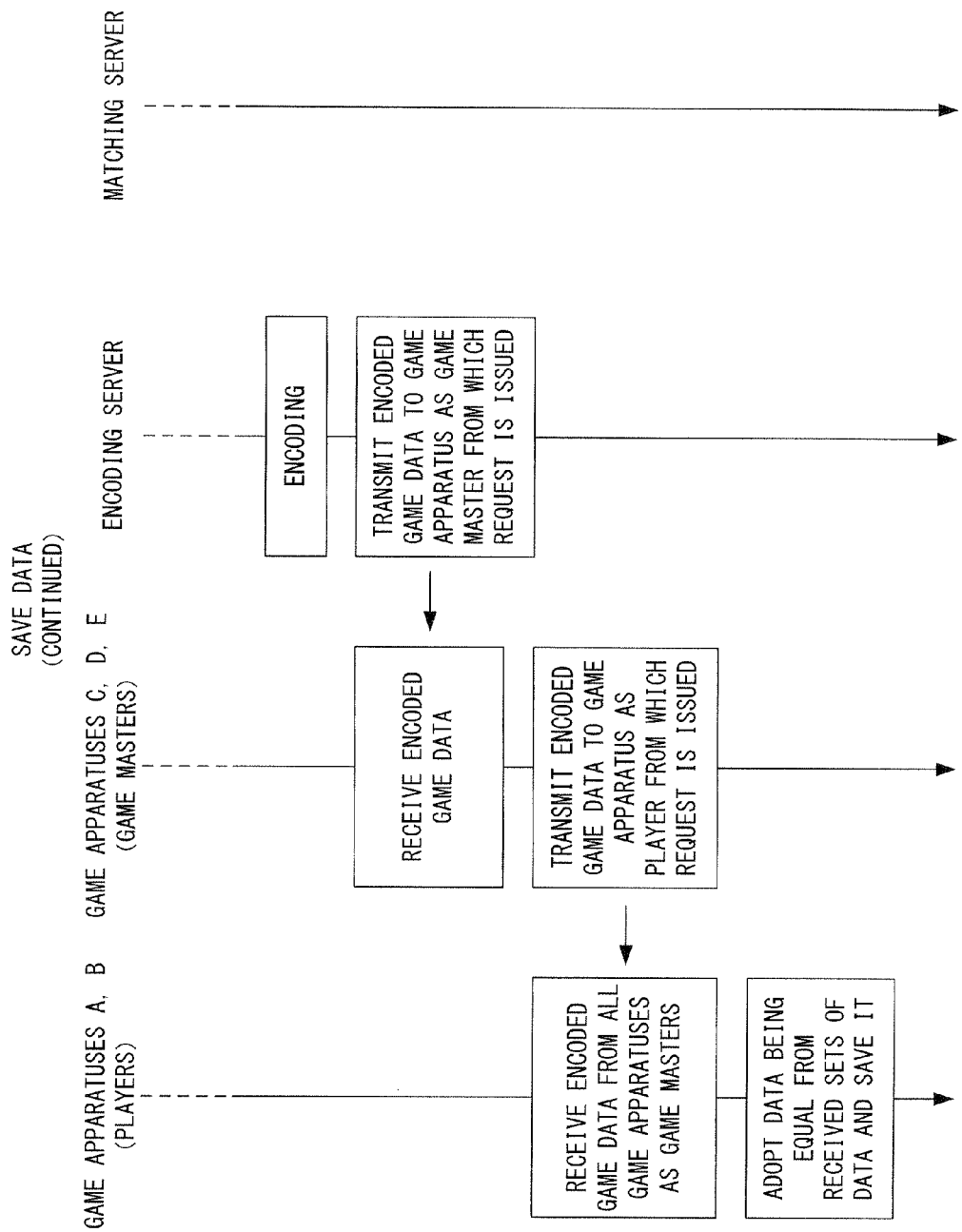
FIG. 7 shows an example non-limiting sequel to the rough flows of the processing by the game apparatuses as players, the game apparatuses as game masters, the encoding server and the matching server in a case that data is saved.

The encoding server 20 receives the determination result, encodes the game data if the authorizedly decided game master is determined, and transmits the encoded game data to the game apparatus 12 as a game master being a source of the request for encoding as shown in FIG. 7. In addition, when the game apparatus 12 as a game master receives the encoded game data, it transmits the encoded game data to the game apparatus 12 as a player being a source of request to save data. Naturally, the encoding server 20 encodes the game data in a format that are decodable by the decoding server 18.

Accordingly, the game apparatus 12 as a player that requests to save data receives the encoded game data. Here, as described above, the game apparatus 12 as a player transmits a request to save data to all the game apparatuses 12 as game masters, and thus receives the encoded game data from all the game apparatuses 12 as game masters if they are authorizedly decided. Thus, the game apparatus 12 as a player adopts and saves proper encoded game data from all the received sets of encoded game data (three, here). In this embodiment, out of the three sets of encoded game data, the encoded game data being identical is adopted as proper encoded game data. That is, based on majority rule, one encoded game data to be saved is decided.

Moreover, during the game, the game apparatus 12 as a game master may disconnect the connection (communication). Even in such a case, a game apparatus 12 as a reserve (hereinafter referred to as "backup node") for continuing the communication game may be prepared. In such a case, the matching server 16 decides the game apparatus 12 as a backup node when the game apparatuses 12 as players and the game apparatuses 12 as game masters are decided in response to a participation request from the game apparatus 12. Accordingly, in the terminal list that is created in the matching server 16 and is to be transmitted to each game apparatus 12, identification information, and connection information of the game apparatus 12 as a backup node and the kind (backup node) are included. The backup node matching (deciding) processing is the same as the game master matching (deciding) processing, and therefore, a redundant description is omitted.

When the game apparatus 12 as a game master is disconnected, the game apparatus 12 as a backup node is promoted to the game master, and a game apparatus 12 as a backup node is newly decided.

By using FIG. 8 and FIG. 9, backup node promoting and matching processing will be described in detail assuming that the game apparatus D is disconnected here. Furthermore, the game apparatus 12 as a backup node is called a "game apparatus F". In addition, the game apparatus 12 as a backup node that is newly decided is called a "game apparatus G".

Figure 8:
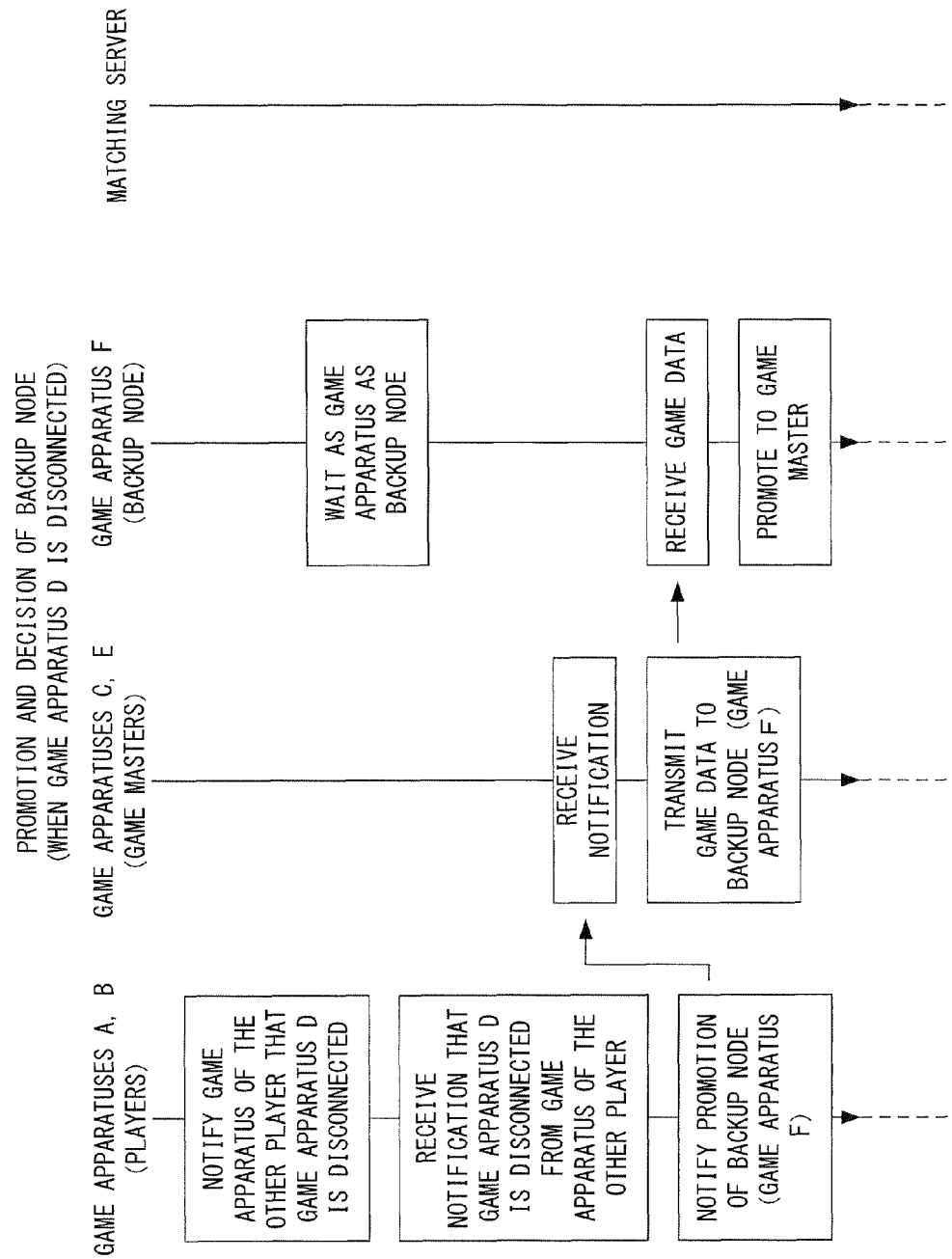
FIG. 8 shows an example non-limiting part of rough flows of processing by the game apparatuses as players, the game apparatuses as game masters, a game apparatus as a backup node and the matching server in a case that the a backup node is promoted and decided.

As shown in FIG. 8, each of the game apparatuses A, B as players detects the disconnection of the game apparatus D. In this embodiment, in a case that the game apparatus 12 as a player cannot acquire result data even after a predetermined time (10 sec., for example) has elapsed from the transmission of the operation data to the game apparatus 12 as a game master, it detects that the connection with the game apparatus 12 from which the result data cannot acquired is disconnected.

When one of the game apparatuses A, B detects the disconnection of the game apparatus D, it notifies the other game apparatus B, A the fact. Accordingly, each of the game apparatus A, B receives the notification that the game apparatus D is disconnected from each other's game apparatuses B, A. That is, the disconnection of the game apparatus D is confirmed by the game apparatuses A, B as players. Then, each of game apparatuses A, B notifies the game apparatuses C, E as game masters with which the connections are not disconnected of a promotion of the backup node (game apparatus F).

When the game apparatuses C, E receive a notification of promotion of the backup node, they transmit the game data to the game apparatus F as a backup node. The game apparatus F which waits for data transmission as a backup node is promoted when receiving the game data. Here, actually, the game apparatus 12 as a backup node is promoted to the game master when the terminal list is updated as described later.

Figure 9:
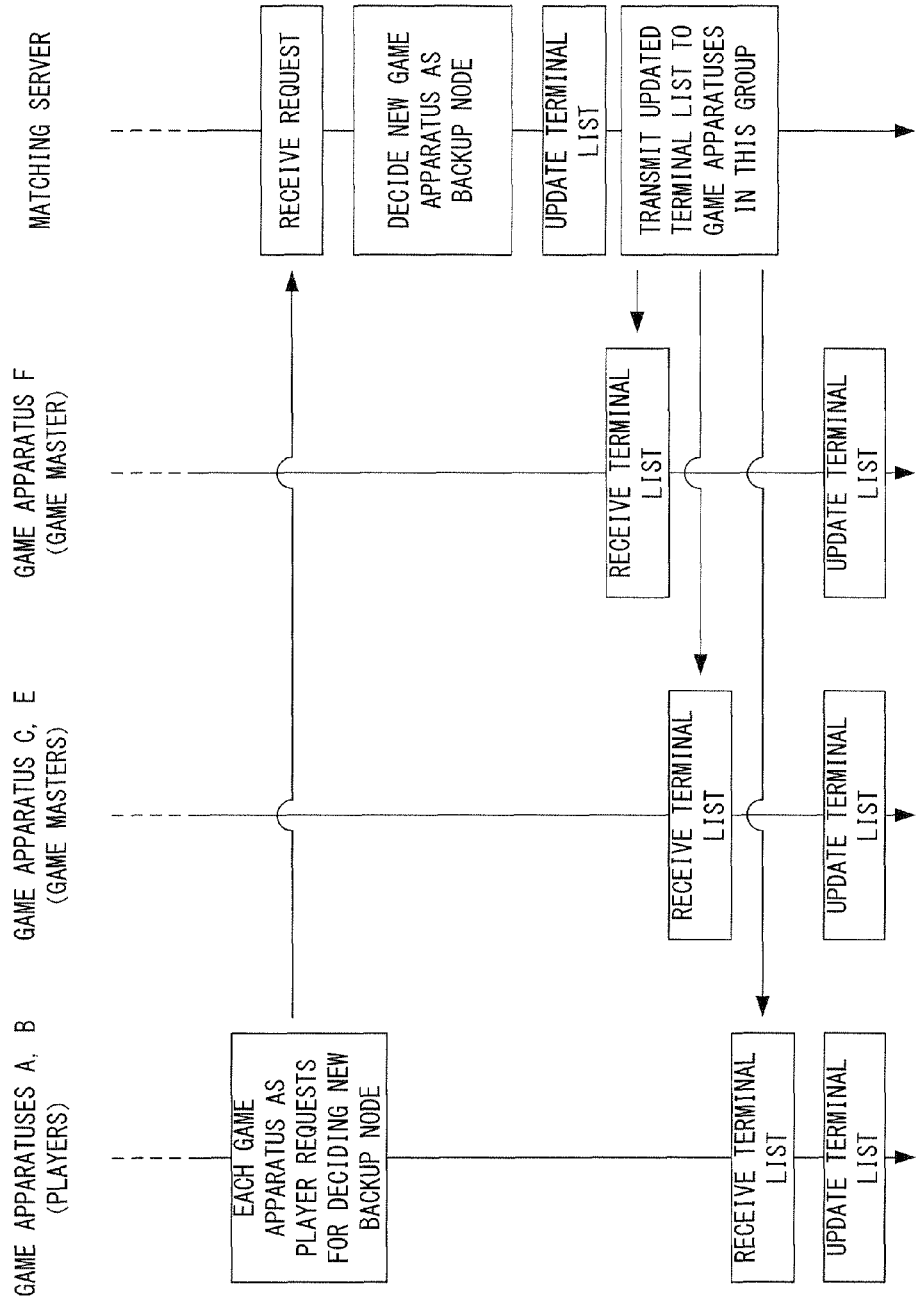
FIG. 9 shows an example non-limiting sequel to the rough flows of the processing by the game apparatuses as players, the game apparatuses as game masters, a game apparatus as a backup node and the matching server in a case that the a backup node is promoted and decided.

Furthermore, when each of game apparatuses A, B as players notifies the game apparatuses C, E as game masters with which the connection is not disconnected of a promotion of the backup node, it request the matching server 16 to decide a new backup node as shown in FIG. 9. Here, the request contains a notification that the game apparatus D is disconnected. Accordingly, the matching server 16 can know that the game apparatus D leaves the group including the game apparatus A and the game apparatus B.

When the matching server 16 receives the request to decide a new backup node, a new game apparatus 12 as a backup node (game apparatus G, here) is decided. The matching (deciding) method is the same as the matching (deciding) method of the game apparatus 12 as a game master (backup node) as described above. The matching server 16 updates the terminal list when deciding the new game apparatus G as a backup node. Here, the identification information, the connection information and the kind (game master) of the game apparatus D are erased. Furthermore, the kind of the game apparatus F is changed to the game master, and the identification information, the connection information and the kind (backup node) of the game apparatus G are additionally written. Thereafter, the matching server 16 transmits the updated terminal list to the respective game apparatuses 12 (game apparatuses A-C, E-G) in the group.

Each of the game apparatuses A-C, and E-G receives the terminal list association with the group, and updates the terminal list of the group. Accordingly, each of the game apparatuses A, B as players continues the communication game by communicating with the game apparatuses C, E, F as game masters. That is, in a case that the backup node is prepared, even if the game apparatus 12 as a game masters is disconnected (left), the communication game is neither terminated (forcibly terminated) nor restarted.

Figure 10:
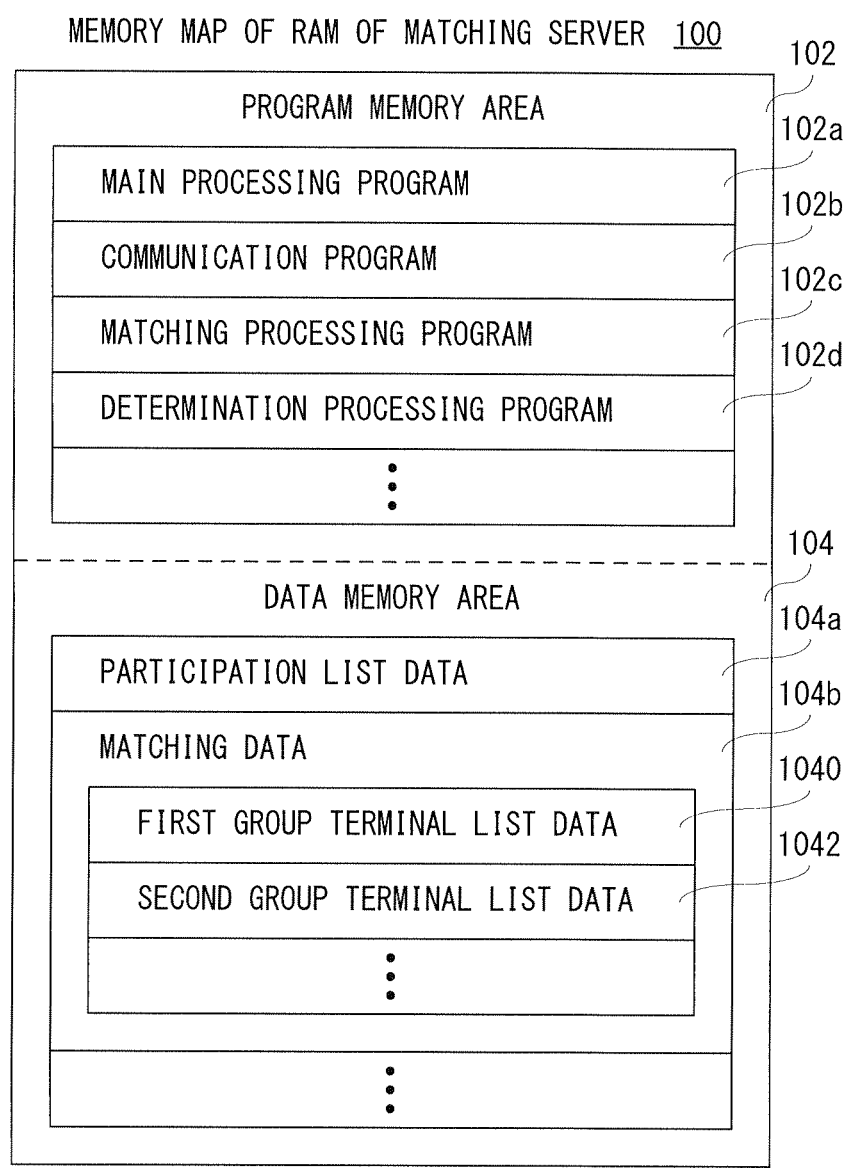
FIG. 10 shows an example non-limiting memory map of a RAM contained in the matching server shown in FIG. 1.

FIG. 10 shows one example of a memory map 100 of the RAM contained in the matching server 16. As shown in FIG. 10, the RAM contained in the matching server 16 includes a program memory area 102 and a data memory area 104. In the program memory area 102, an information processing program is stored, and the information processing program is made up of a main processing program 102a, a communication program 102b, a matching processing program 102c, a determination processing program 102d, etc.

The main processing program 102a is a program for processing a main routine of the matching server 16. The communication processing program 102b is a program for communicating with the devices and the computers, such as the game apparatus 12, the decoding server 18, the encoding server 20, etc. directly or via the network 14.

The matching processing program 102c is a program for deciding or performing a matching (grouping) of game apparatuses 12 as players, game apparatuses 12 as game masters and a game apparatus 12 as a backup node, and creating terminal list data for each group. The determination processing program 102d is a program for determining whether or not the game apparatus 12 being a source of a request to decode the encoded game data and to encode the game data is an authorized game master.

Although illustration is omitted, in the program memory area 102, a game program to be downloaded into the game apparatus 12, etc. is also stored.

In the data memory area 104, participant list data 104a, matching data 104b, etc. are stored. The participant list data 104a is data representing terminal information (identification information and connection information) of all the game apparatuses 12 from each of which a request to participate in the communication game is accepted in a list (table) form.

The matching data 104b is data storing the terminal list of the game apparatuses 12 that are decided as players, as game masters and as a backup node in a unit of a group. That is, the matching data 104b includes first group terminal list data 1040, second group terminal list data 1042, . . . , etc. Each terminal list data (1040, 1042, . . . ) is data on a list (table) in which terminal information of each game apparatus 12 included in the group is described with decided (matched) information (discrimination among a player, a game master and backup node).

Although illustration is omitted, in the data memory area 104, other data necessary for execution of the information processing program are stored, and timers (counters) and flags are provided.

Figure 11:
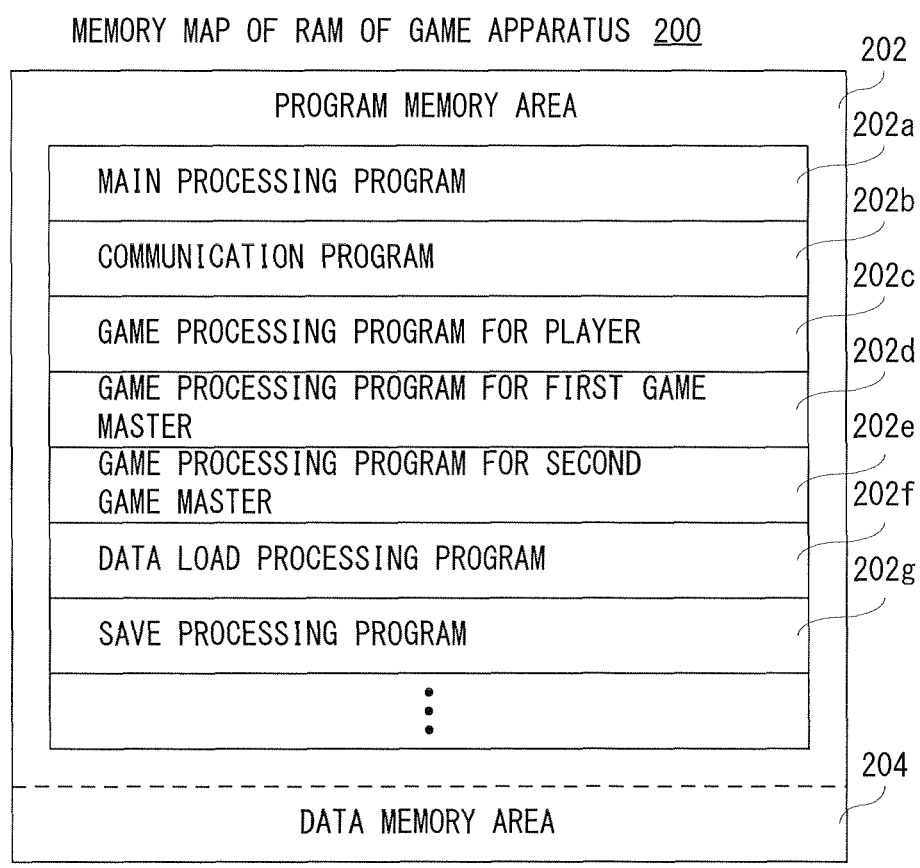
FIG. 11 shows an example non-limiting memory map of a RAM contained in the game apparatus shown in FIG. 2.
Figure 12:
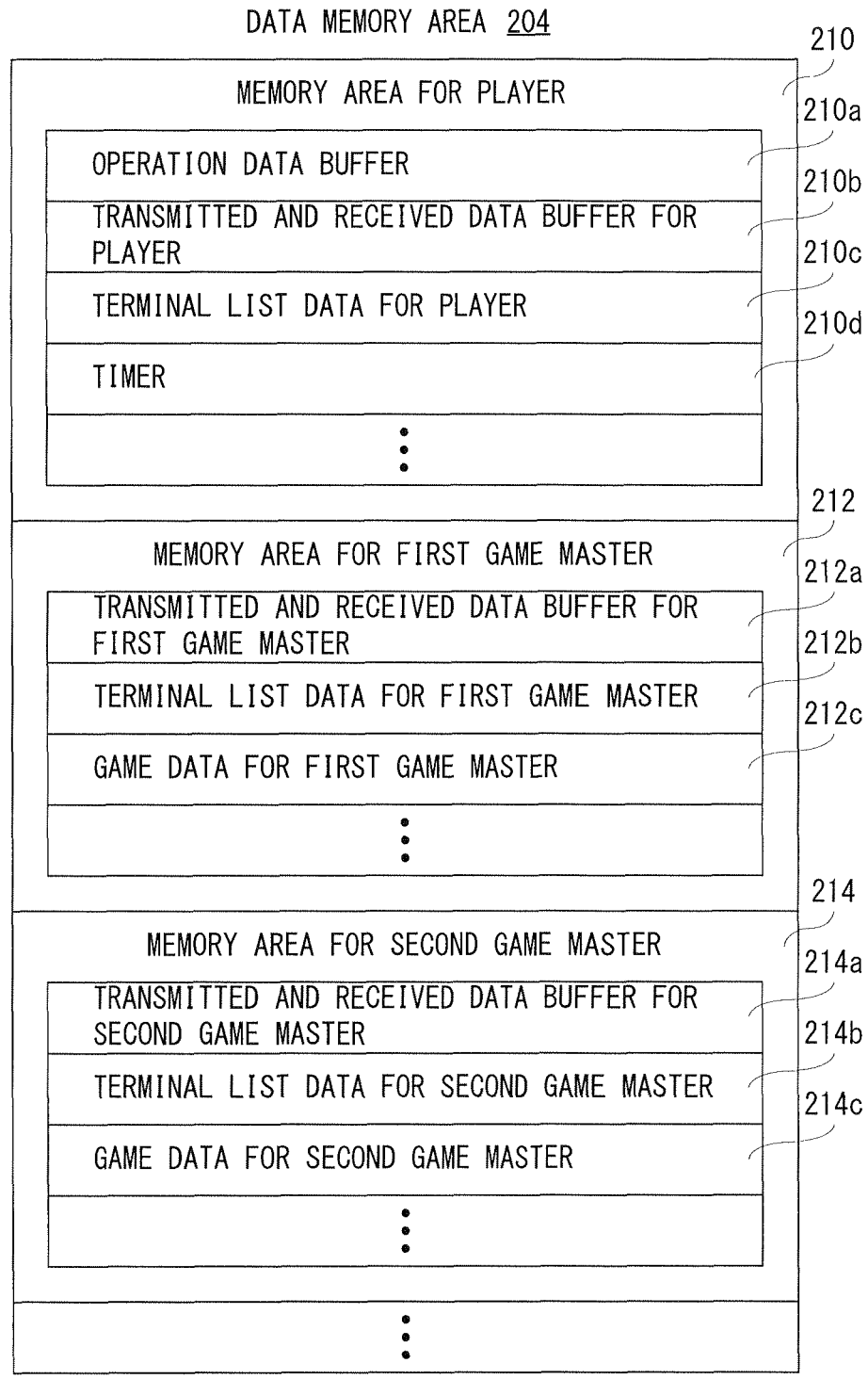
FIG. 12 shows an example non-limiting detailed contents of the data memory area shown in FIG. 11.

FIG. 11 and FIG. 12 show one example of a memory map 200 of the RAM 32 contained in the game apparatus 12 shown in FIG. 2. As shown in FIG. 11, the RAM 32 includes a program memory area 202 and a data memory area 204. The program memory area 202 stores a game program, and the game program is made up of a main processing program 202a, a communication program 202b, a game processing program for player 202c, a game processing program for first game master 202d, a game processing program for second game master 202e, a data loading processing program 202f and save processing program 202g, etc.

It should be noted that the game program is loaded from the flash memory 34, downloaded from computers or servers that are connected via the network 14, or loaded from a storage medium, such as a game cartridge, an SD card, etc.

The main processing program 202a is a program for processing a main routine of the communication game. The communication program 202b is a program for communicating with other game apparatuses (12) and computers directly or via the network 14.

The game processing program for player 202c is a game processing program in a case that the game apparatus 12 functions as a player, and mainly advances the communication game by depicting and displaying game images and generating and outputting game sounds on the basis of result data from the game master.

The game processing program for first game master 202d is a game processing program in a case that the game apparatus 12 functions as a first game master, and mainly executes the game processing by using game data (game data for first game master 212c described later) on the basis of the operation data from the respective game apparatuses 12 as players in the group in which the game apparatus participates as a first game master.

The game processing program for second game master 202e is a game processing program in a case that the game apparatus 12 functions as a second game master, and mainly executes the game processing by using game data (game data for second game master 214c described later) on the basis of the operation data from the respective game apparatuses 12 as players in the group in which the game apparatus participates as a second game master.

The data loading processing program 202f is a program for executing data loading processing in a case that the game apparatus functions as a player, and in a case that the game apparatus functions as a game master. More specifically, in a case that the game apparatus 12 functions as a player, the data loading processing program 202f requests each game apparatus 12 as a game master to load data prior to the start of the communication game. Furthermore, in a case that the game apparatus 12 functions as a game master, the data loading processing program 202f requests the decoding server 18 to decode the encoded game data in response to a request to load data from the game apparatus 12 as a player, and stores the game data (game data for first game master 212c, game data for second game master 214c) decoded by the decoding server 18 in response thereto in the data memory area 204.

The save processing program 202g is a program for executing save processing in a case that the game apparatus functions as a player, and in a case that the game apparatus functions as a game master. More specifically, in a case that the game apparatus 12 functions as a player, the save processing program 202g requests each of all the game apparatuses 12 as game masters to save data in response to occurrence of a predetermined event, according to an instruction by the player or the game end, receives the encoded game data from each of the game apparatuses 12 as game masters in response thereto, and stores (saves) the encoded game data being identical in the flash memory 34. Furthermore, in a case that the game apparatus 12 functions as a game master, the save processing program 202g requests the encoding server 20 to encode the game data if a request to save data is issued from the game apparatus 12 as a player, receives the encoded game data transmitted from the encoding server 20 in response thereto, and transmits it to the game apparatus 12 as a player being a source of request to save data.

Although illustration is omitted, in the program memory area 202, an image displaying program, a sound output program, etc. are also stored.

As shown in FIG. 12, the data memory area 204 further includes a memory area for player 210, a memory area for first game master 212 and a memory area for second game master 214.

The memory area for player 210 is provided with an operation data buffer 210a and a transmitted and received data buffer for player 210b. The operation data buffer 210a stores operation data from the input device 38. The transmitted and received data buffer for player 210b stores data to be transmitted and received to and from the game apparatuses 12 as game masters and the matching server 16.

Furthermore, in the memory area for player 210, terminal list data for player 210c is stored. The terminal list data for player 210c is data on the terminal list as to a group in which the game apparatus 12 participates as a player.

Also, in the memory area for player 210, a timer 210d is provided. The timer 210d is used to count a predetermined time (10 sec., for example) for determining whether or not a connection with the game apparatus 12 as a game master is disconnected.

Although illustration is omitted, in the memory area for player 210, other data necessary when the game apparatus 12 functions as a game apparatus 12 as a player is stored, and other timers (counters) and flags are provided.

In the memory area for first game master 212, a transmitted and received data buffer for first game master 212a is provided. The transmitted and received data buffer for first game master 212a stores data to be transmitted and received to and from the game apparatuses 12 as players, the matching server 16, the decoding server 18 and the encoding server 20 in a case that the game apparatus 12 functions as a first game master.

Furthermore, in the memory area for first game master 212, terminal list data for first game master 212b and game data for first game master 212c are stored. The terminal list data for first game master 212b is data on the terminal list about a group in which the game apparatus 12 is decided as a first game master. The game data for first game master 212c is game data of each game apparatus 12 as a player in the group in which the game apparatus 12 is decided as a first game master. In this embodiment, the game apparatus 12 as a player is two, and thus, in the game data for first game master 212c, two kinds of game data (corresponding to the aforementioned game data A and game data B) are included. This holds true for game data for second game master 214c described later.

Although illustration is omitted, in the memory area for first game master 212, other data necessary when the game apparatus 12 functions as a game apparatus 12 as a first game master, and other timers (counters) and flags are provided.

In the memory area for second game master 214, a transmitted and received data buffer for second game master 214a is provided. The transmitted and received data buffer for second game master 214a stores data to be transmitted and received to and from the game apparatuses 12 as players, the matching server 16, the decoding server 18 and the encoding server 20 in a case that the game apparatus 12 functions as a second game master.

Also, in the memory area for second game master 214, terminal list data for second game master 214b and game data for second game master 214c are stored. The terminal list data for second game master 214b is data on the terminal list about a group in which the game apparatus 12 is decided as a second game master. The game data for second game master 214c is game data of each game apparatus 12 as a player in the group in which the game apparatus 12 is decided as a second game master.

Although illustration is omitted, in the memory area for second game master 214, other data necessary when the game apparatus 12 functions as a game apparatus 12 as a second game master, and other timers (counters) and flags are provided.

Hereafter, the detailed processing to be executed in the game apparatus 12, the matching server 16, the decoding server 18, and the encoding server 20 is described.

Figure 13:
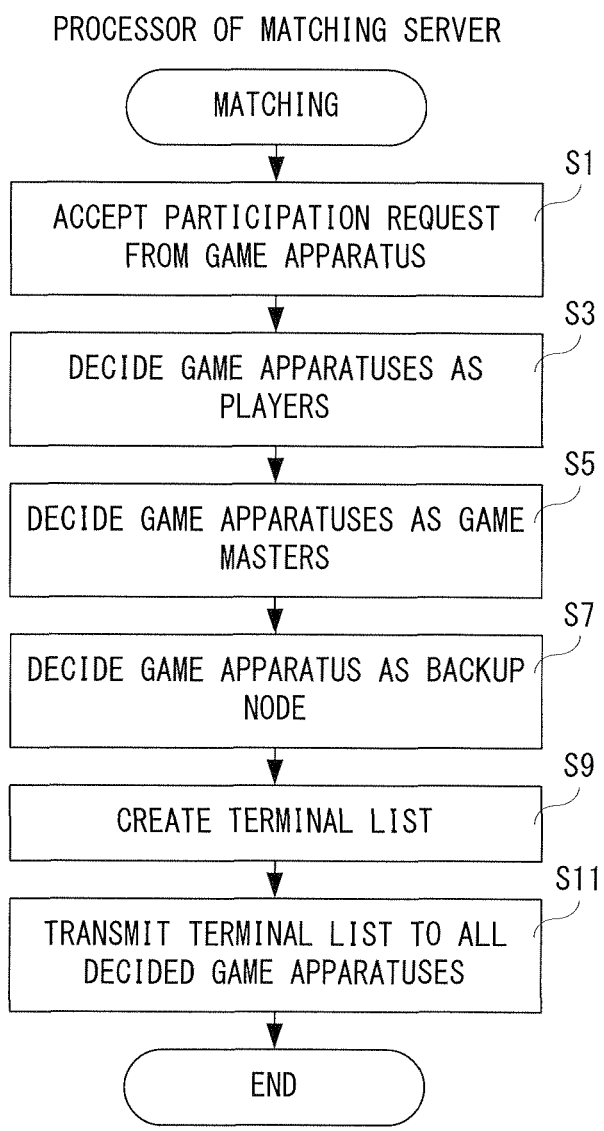
FIG. 13 shows an example non-limiting flowchart showing matching processing by a processor of the matching server.
Figure 14:
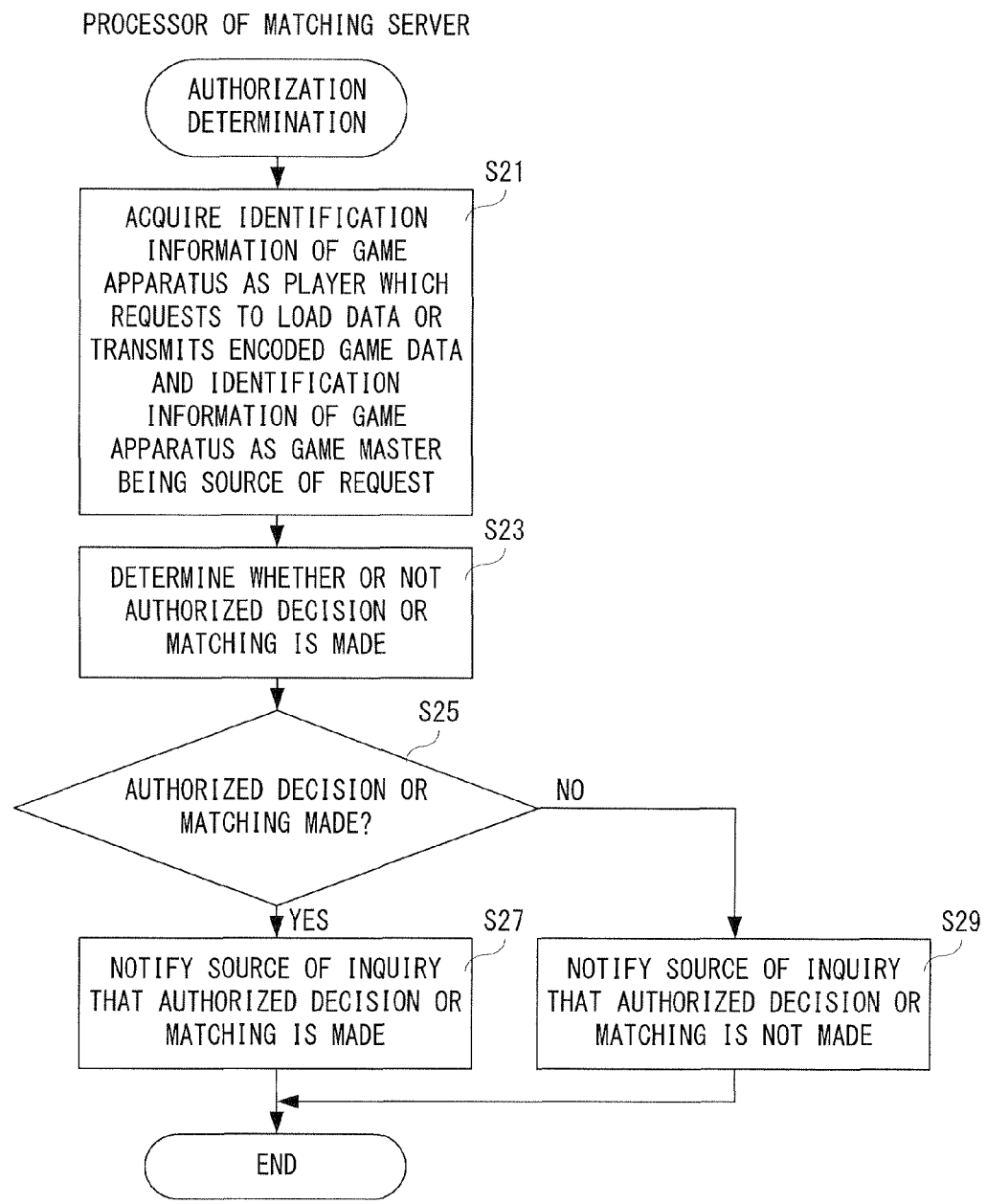
FIG. 14 shows an example non-limiting flowchart showing authorization determining processing by the processor of the matching server.
Figure 15:
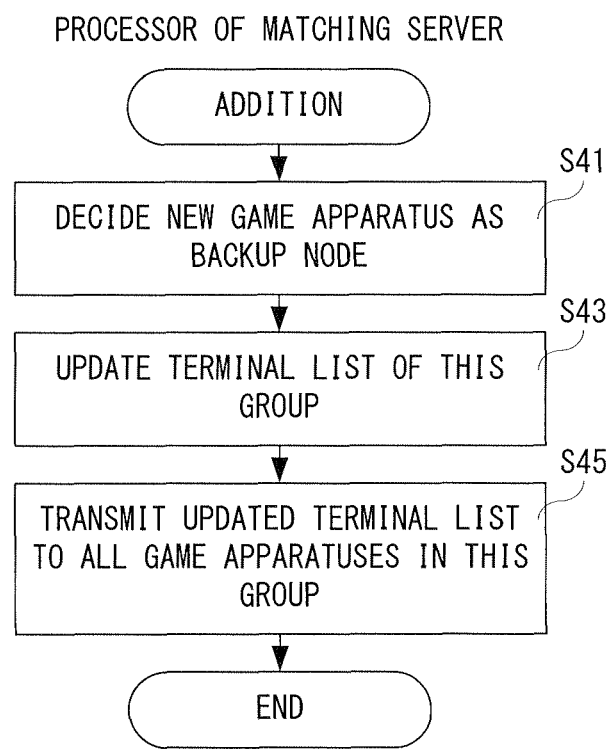
FIG. 15 shows an example non-limiting flowchart showing backup processing by the processor of the matching server.

FIG. 13, FIG. 14 and FIG. 15 respectively show matching processing, authorization determining processing and addition processing by the processor of the matching server 16. Each processing is executed according to a different task. The matching processing shown in FIG. 13 is executed for each predetermined time (10 minutes, for example), for example, and the authorization determining processing shown in FIG. 14 and the addition processing shown in FIG. 15 are executed in response to a request from the game apparatus 12. Accordingly, if a request from the game apparatus 12 is issued, the task is activated (executed) for each request.

FIG. 13 is a flowchart showing one example of the matching processing by the processor of the matching server. As shown in FIG. 13, when starting the matching processing, the processor of the matching server 16 accepts a participation request from the game apparatus 12 in a step S1. Although detailed description is omitted, the participation request from the game apparatus 12 includes the identification information and the connection information of the game apparatus 12.

In a next step S3, two game apparatuses 12 as players are decided (subject to matching) from the game apparatuses 12 from each of which the participation request is issued (may be referred to as being subject to matching in this embodiment). Succeedingly, in a step S5, three game apparatuses 12 as game masters are decided. In addition, in a step S7, the game apparatus 12 as a backup node is decided.

In a successive step S9, a terminal list is created. That is, the processor of the matching server 16 creates the terminal list about a group being made up of the two game apparatuses 12 as players decided in the step S3, the three game apparatuses 12 as game masters decided in the step S5, and one game apparatus 12 as a backup node decided in the step S7. Next, in a step S11, the terminal list is transmitted to all the decided (matched) game apparatuses 12, and the matching processing is ended.

Meanwhile, when the processor of the matching server 16 receives a request for determination processing from the decoding server 18 or the encoding server 20, it starts the authorization determining processing as shown in FIG. 14, and acquires identification information (player terminal information) of the game apparatus 12 as a player which requests to load data or transmits the encoded game data and the identification information (source of the request for decoding terminal information or source of the request for encoding terminal information) of the game apparatus 12 as a game master being the source of the request in a step S21. In a next step S23, it is determined whether or not an authorized decision or matching is made. That is, the processor of the matching server 16 determines whether or not the identification information of the game apparatus 12 as a player and the identification information of the game apparatus 12 as a game master being the source of the request that are acquired in the step S21 belong to the same group, and the player and the game master are authorizedly decided, with reference to the matching data 104*b*.

In a succeeding step S25, it is determined whether or not an authorized decision or matching is made. If "YES" in the step S25, that is, if an authorized decision or matching is made, the matching server 16 notifies the decoding server 18 or the encoding server 20 being the source of the inquiry that the authorized decision or matching is made in a step S27, and the authorization determining processing is ended. On the other hand, if "NO" in the step S25, that is, if an authorized decision or matching is not made, the matching server 16 notifies the decoding server 18 or the encoding server 20 being the source of the request that an authorized decision or matching is not made in a step S29, and the authorization determining processing is ended.

Furthermore, when the processor of the matching server 16 receives a request to decide a new backup node from the game apparatus 12 as a player, it starts the addition processing shown in FIG. 15 to decide a new game apparatus 12 as a backup node in a step S41.

It should be noted that in the request to decide the backup node, the identification information of the game apparatus 12 which disconnects the connections is included as described above.

In a next step S43, the terminal list of this group is updated. As described above, with respect to the terminal list, the processor of the matching server 16 erases the identification information, the connection information and the kind of the game apparatus 12 which disconnects the connection, changes the kind of the game apparatus 12 as a backup node (game apparatus F) from the backup node to the game master, and adds the identification information, the connection information and kind (backup node) of the game apparatus 12 (game apparatus G) decided in the step S41 thereto.

Then, in a step S45, the updated terminal list is transmitted to all the game apparatuses 12 in this group. Accordingly, in the processing by the game apparatus 12 described later, the terminal list is updated, and according to the updated terminal list, the game apparatuses 12 as players and the game apparatuses 12 as game masters communicate with each other to thereby advance the communication game thereafter.

Figure 16:
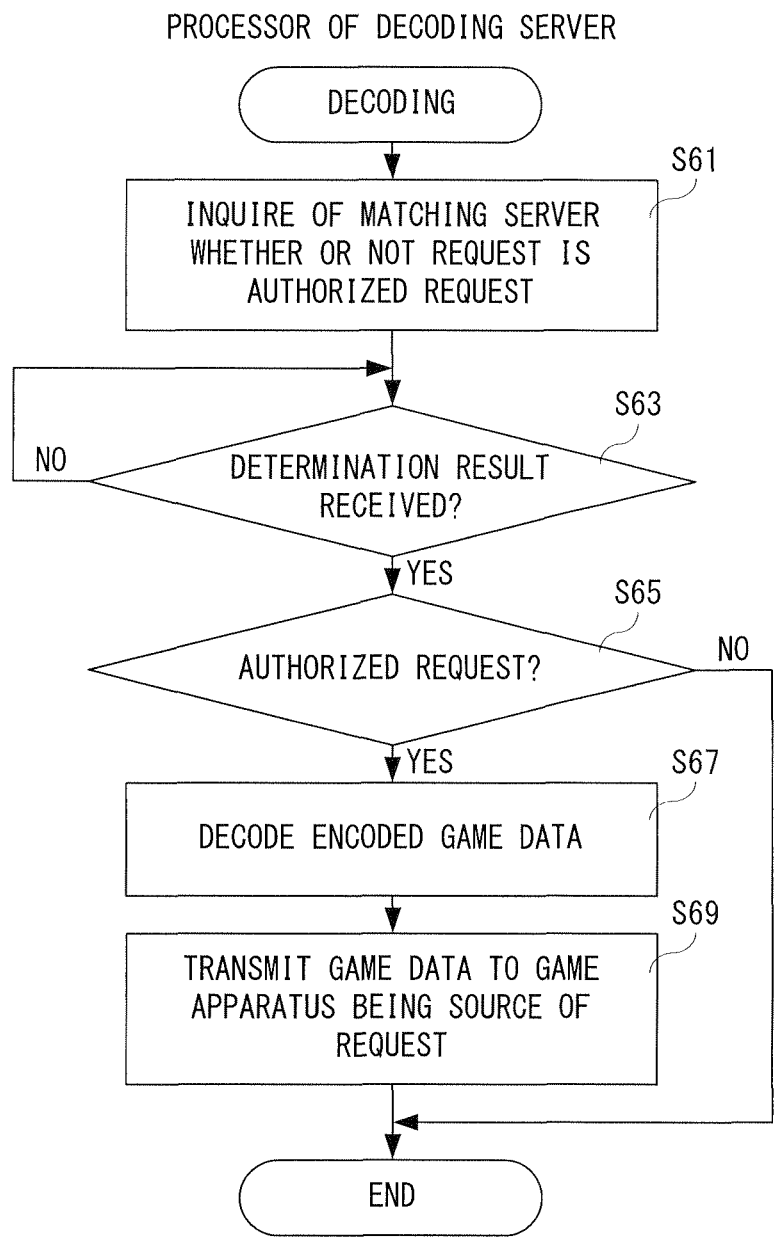
FIG. 16 shows an example non-limiting flowchart showing decoding processing by a processor of the decoding server.

FIG. 16 is a flowchart showing decoding processing by the processor of the decoding server 18. When receiving a request for decoding together with the encoded game data from the game apparatus 12 as a player, the processor of the decoding server 18 starts the decoding processing, and inquires of the matching server 16 whether the request is an authorized request in a step S61.

In a succeeding step S63, it is determined whether or not the determination result is received from the matching server 16. If "NO" in the step S63, that is, if the determination result from the matching server 16 is not received, the process returns to the same step S63. That is, the processor of the decoding server 18 waits for reception of the determination result. On the other hand, if "YES" in the step S63, that is, if the determination result from the matching server 16 is received, it is determined whether an authorized request or not in a step S65. That is, the processor of the decoding server 18 determines whether or not the received determination result indicates an authorized request.

If "NO" in the step S65, that is, if the result does not indicate the authorized request, the decoding processing is ended as it is. That is, the encoded game data is not decoded, and thus, raw game data is never transmitted to the game apparatus 12 that is not authorizedly decided (is not authorizedly subject to matching). On the other hand, if "YES" in the step S65, that is, if the result indicates the authorized request, the encoded game data is decoded in a step S67, the game data is transmitted to the game apparatus 12 as a game master being a source of the request for decoding in a step S69, and then, the decoding processing is ended.

As described above, the request for decoding is transmitted from all the game apparatuses 12 as game masters in each group, and therefore, such the decoding processing is executed every decoding request. Accordingly, in a case that the requests for decoding are received around the same time, respective decoding process is executed in parallel.

Figure 17:
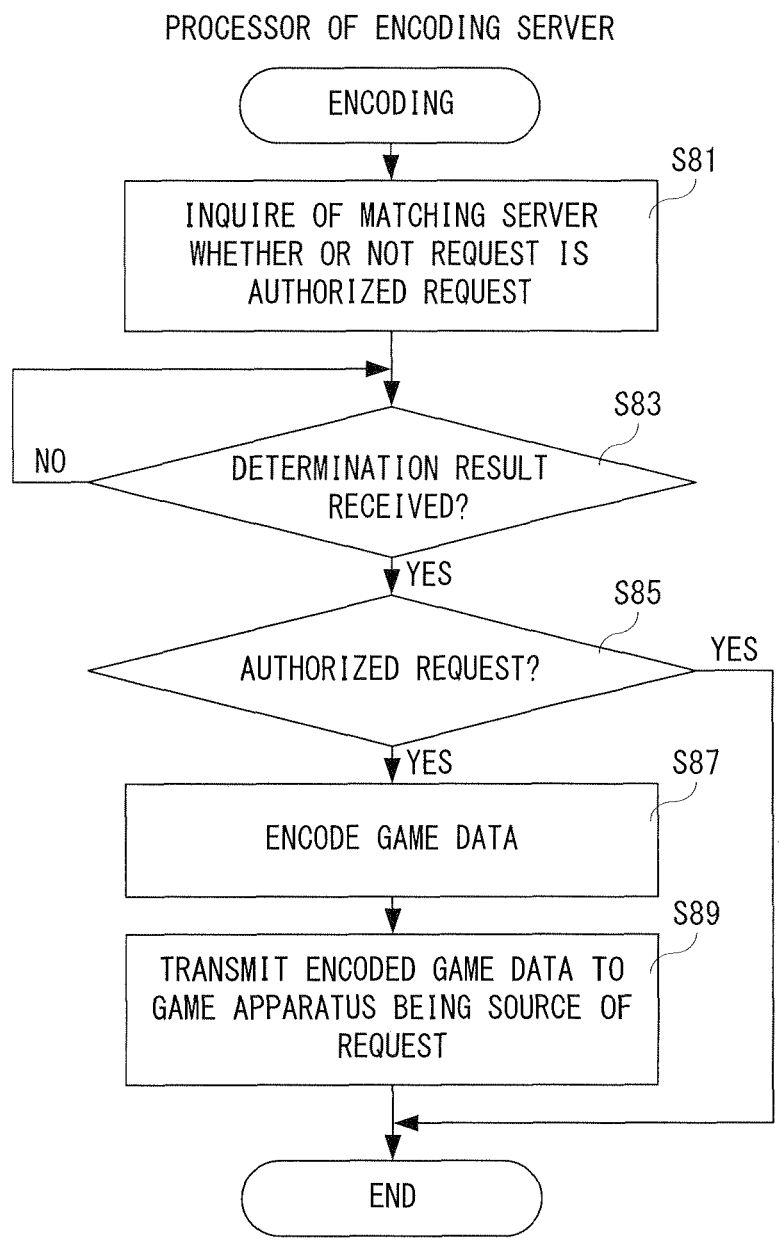
FIG. 17 shows an example non-limiting flowchart showing encoding processing by a processor of the encoding server.

FIG. 17 is a flowchart showing encoding processing by the processor of the encoding server 20. When receiving a request for encoding together with the game data from the game apparatus 12 as a game master, the processor of the encoding server 20 starts the encoding processing, and inquires of the matching server 16 whether or not the request is an authorized request in a step S81.

In a succeeding step S83, it is determined whether or not the determination result is received from the matching server 16. If "NO" in the step S83, that is, if the determination result from the matching server 16 is not received, the process returns to the same step S83. That is, the processor of the encoding server 20 waits for reception of the determination result. On the other hand, if "YES" in the step S83, that is, if the determination result from the matching server 16 is received, it is determined whether an authorized request or not in a step S85. That is, the processor of the encoding server 20 determines whether or not the received reception result indicates an authorized request.

If "NO" in the step S85, that is, if the result does not indicate the authorized request, the encoding processing is ended as it is. That is, the game data is not encoded, and thus, the encoded game data is never transmitted to the game apparatus 12 that is not authorizedly decided (is not authorizedly subject to matching). On the other hand, if "YES" in the step S85, that is, if the result indicates the authorized request, the game data is encoded in a step S87, the encoded game data is transmitted to the game apparatus 12 as a game master being the source of the request for encoding in a step S89, and the encoding processing is ended.

As described above, the request for encoding is transmitted from all the game apparatuses 12 as game masters in each group, and thus, such the encoding processing is executed every request for encoding. Accordingly, if the requests for encoding are issued around the same time, respective encoding processing is executed in parallel.

Figure 18:
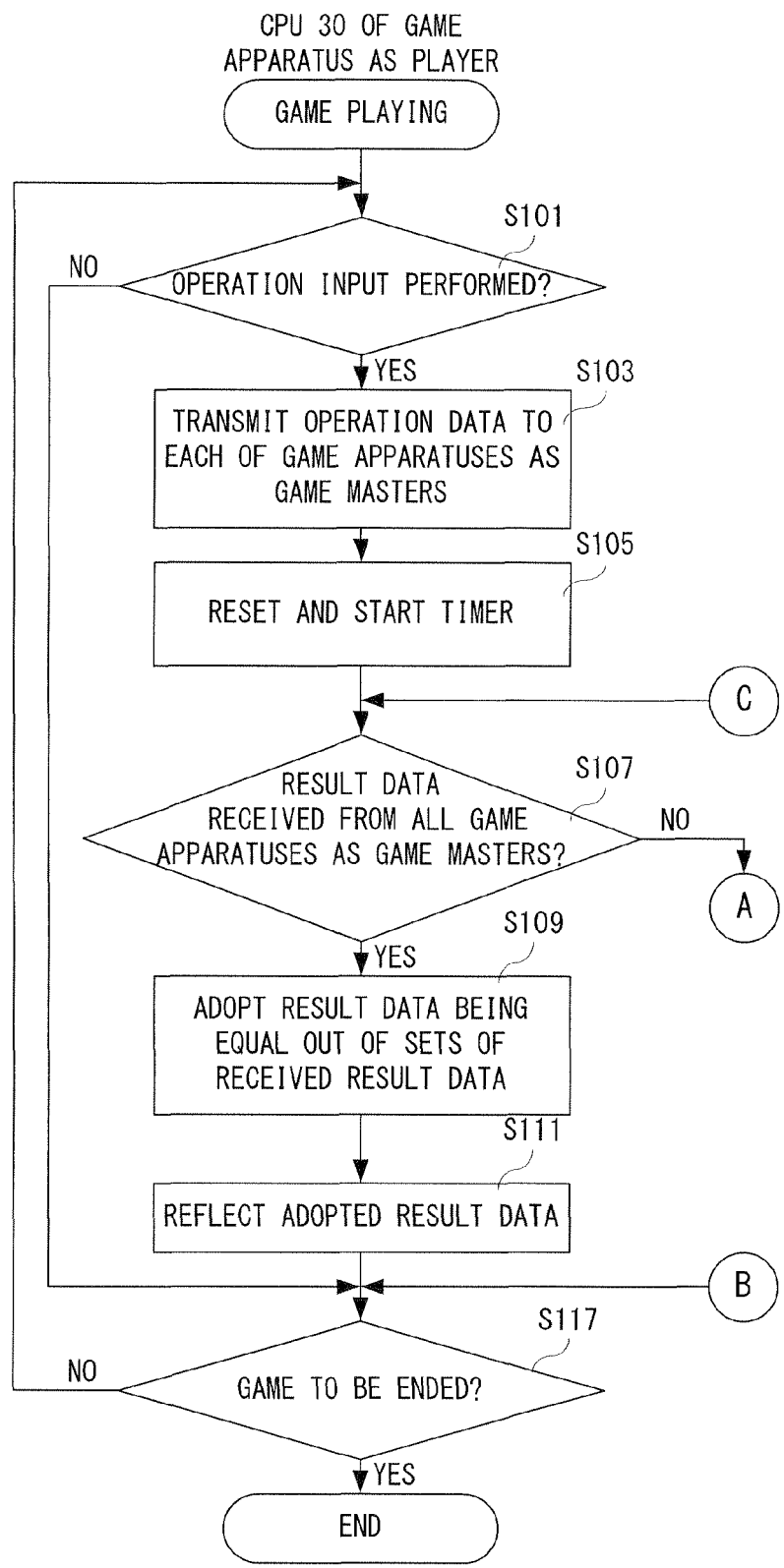
FIG. 18 shows an example non-limiting flowchart showing a part of game playing processing by the CPU of a game apparatus as a player.
Figure 19:
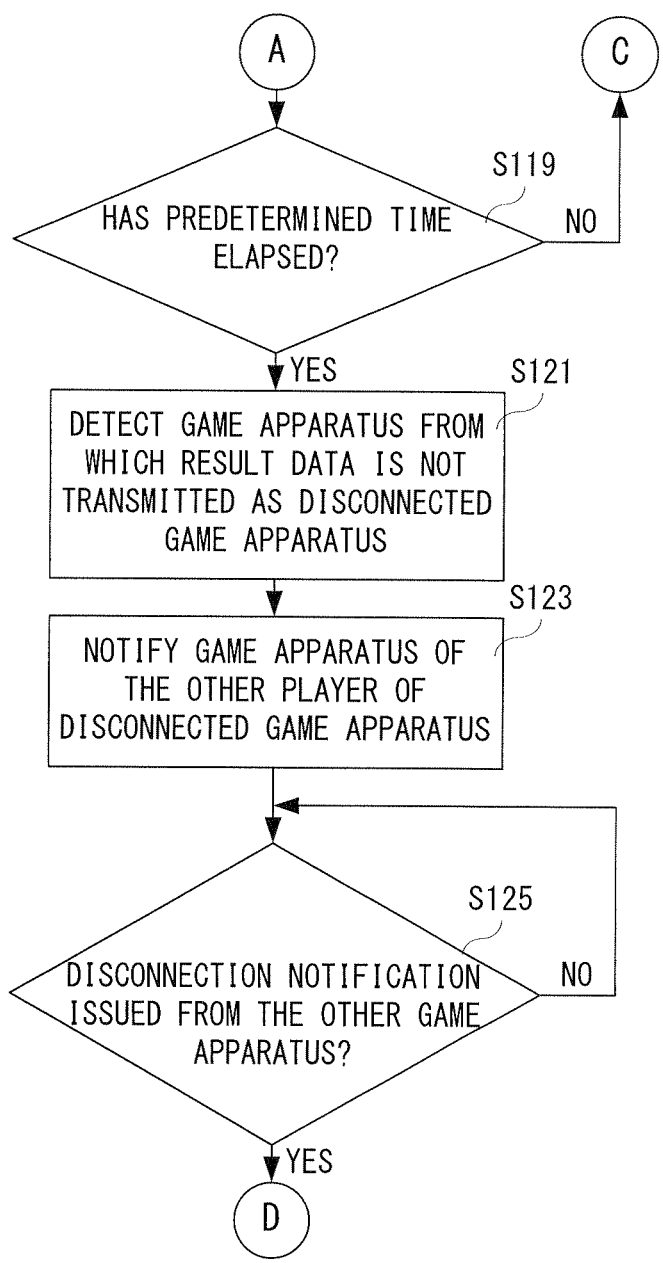
FIG. 19 shows an example non-limiting flowchart showing another part of the game playing processing by the CPU of the game apparatus as a player.
Figure 20:
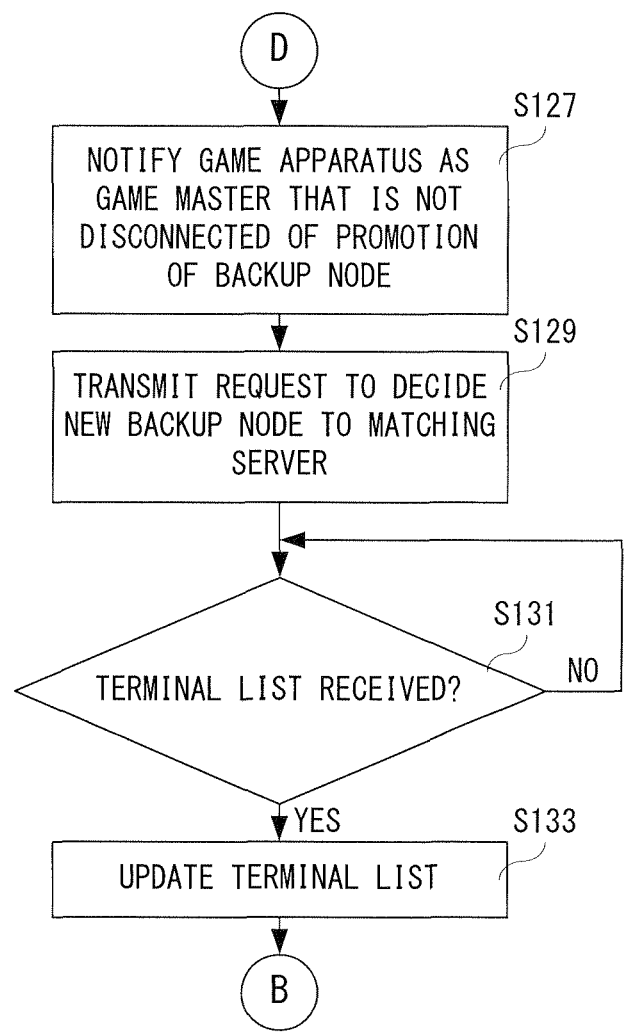
FIG. 20 shows an example non-limiting flowchart showing still another part of the game playing processing by the CPU of the game apparatus as a player.
Figure 21:
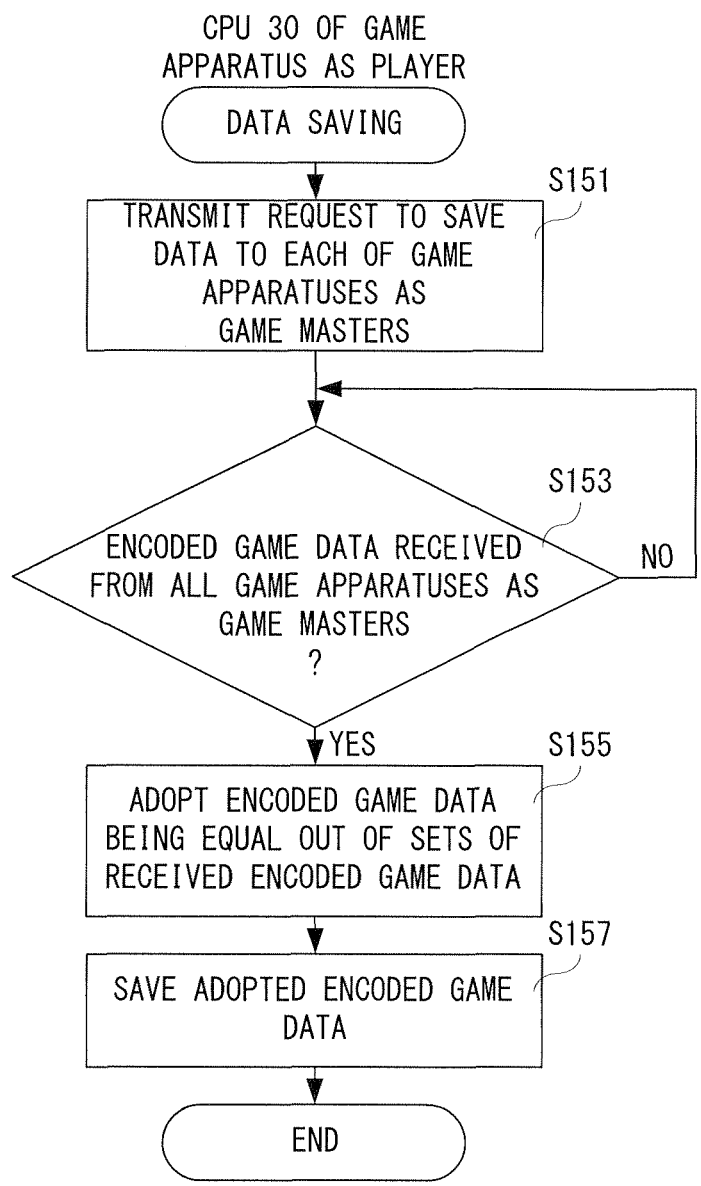
FIG. 21 shows an example non-limiting flowchart showing data saving processing by the CPU of the game apparatus as a player.
Figure 22:
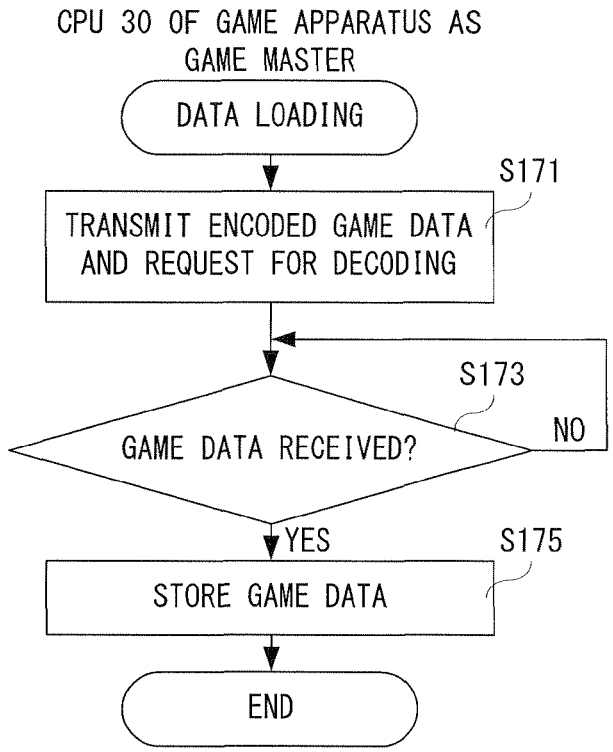
FIG. 22 shows an example non-limiting flowchart showing data loading processing by a CPU of a game apparatus as a game master.
Figure 23:
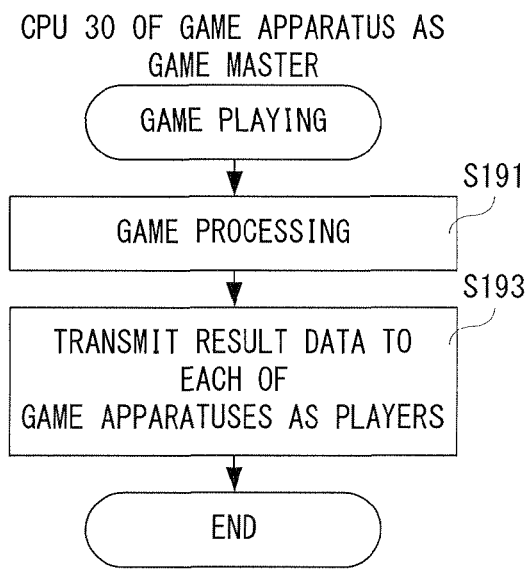
FIG. 23 shows an example non-limiting flowchart showing game playing processing by the CPU of the game apparatus as a game master.
Figure 24:
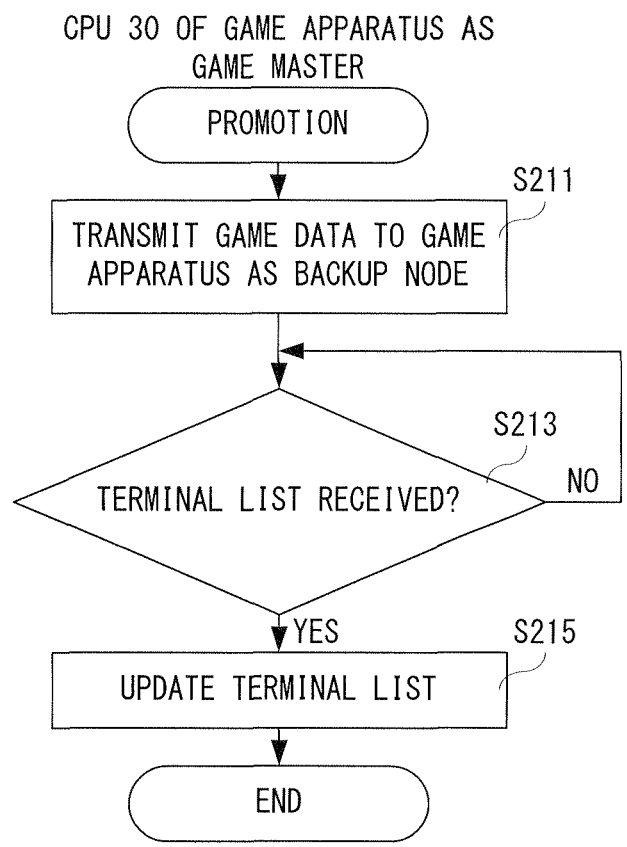
FIG. 24 shows an example non-limiting flowchart showing promotion processing by the CPU of the game apparatus as a game master.
Figure 25:
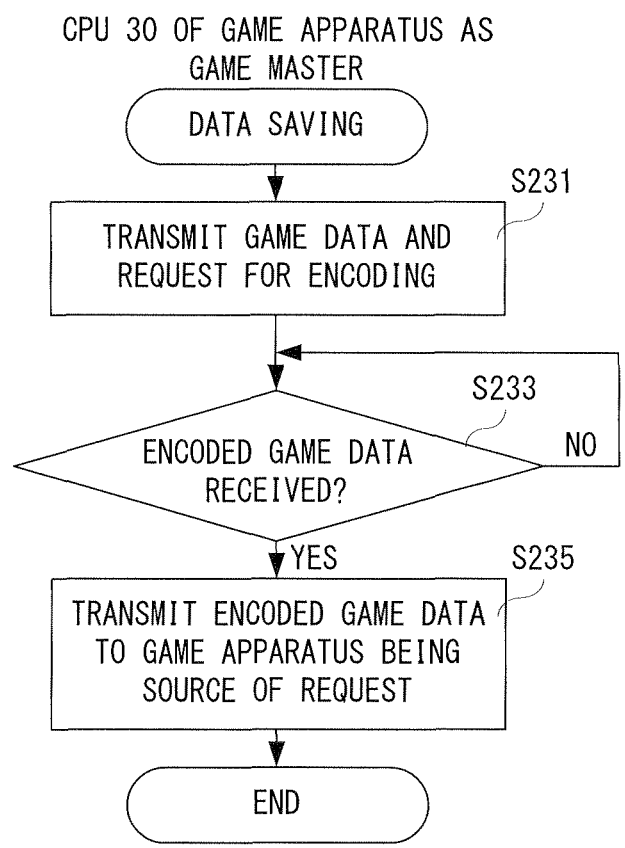
FIG. 25 shows an example non-limiting flowchart showing data saving processing by the CPU of the game apparatus as a game master.

FIG. 18 to FIG. 20 are flowcharts showing game playing processing by the CPU 30 of the game apparatus 12 as a player. FIG. 21 is a flowchart showing data saving processing by the CPU 30 of the game apparatus 12 as a player. FIG. 22 is a flowchart showing data loading processing by the CPU 30 of the game apparatus 12 as a game master. FIG. 23 is a flowchart showing the game playing processing by the CPU 30 of the game apparatus 12 as a game master. FIG. 24 is a flowchart showing addition processing by the CPU 30 of the game apparatus 12 as a game master. FIG. 25 is a flowchart showing data saving processing by the CPU 30 of the game apparatus 12 as a game master.

Hereafter, the description is made on the processing by the CPU 30 of the game apparatus 12 as a player and the processing by the CPU 30 of the game apparatus 12 as a game master that are included in one group. Here, as described above, one game apparatus 12 functions as a player in one group, and functions as a game master or a backup node in the other two groups. Thus, focusing on one game apparatus 12, each processing shown in FIG. 18 to FIG. 24 may be executed in the game apparatus 12. Also, in a case that the game apparatus 12 functions as a game master in the two groups, each processing shown in FIG. 22 to FIG. 25 is executed with respect to each of the two groups.

It should be noted that although the illustration in detail is omitted, the game apparatus 12 as a player executes the data loading processing for transmitting the encoded game data to each of the game apparatuses 12 as game masters prior to start of the communication game (game playing).

As shown in FIG. 18, when starting the game playing processing, the CPU 30 of the game apparatus 12 as a player determines whether or not an operation input is performed in a step S101. Here, the CPU 30 determines whether or not the operation data is stored in the operation data buffer 210a. If "NO" in the step S101, that is, if an operation input is not performed, the process proceeds to a step S117. On the other hand, if "YES" in the step S101, that is, if an operation input is performed, operation data is transmitted to each of the game apparatuses 12 as game masters in a step S103, and the timer 210d is reset and started in a step S105.

Succeedingly, in a step S107, it is determined whether or not result data is received from all the game apparatuses 12 as game masters. If "NO" in the step S107, that is, if the game apparatus 12 as a game master from which the result data is not transmitted exists, the process proceeds to a step S119 shown in FIG. 19. On the other hand, if "YES" in the step S107, that is, if the result data is received from all the game apparatuses 12 as game masters, the result data being identical is adopted in a step S109. Then, in a step S111, the adopted result data is reflected. That is, the CPU 30 advances the game by depicting game images and outputting (displaying) it to the display 42, and generating game sounds and outputting it to the speaker 46 based on the adopted result data.

Then, in the step S117, it is determined whether or not the game is to be ended. The CPU 30 determines whether or not a game end instruction is input, or the game is over in the step S117. If "NO" in the step S117, that is, if the game is not to be ended, the process returns to the step S101 as it is. On the other hand, if "YES" in the step S117, game playing processing is ended.

As described above, if the game apparatus 12 as a game master from which the result data is not transmitted exists, it is determined whether or not a predetermined time has elapsed in the step S119 shown in FIG. 19. That is, the CPU 30 determines whether or not the count value by the timer 210d is larger than a predetermined time. If "NO" in the step S119, that is, if the predetermined time has not elapsed, the process returns to the step S107 shown in FIG. 18 as it is. That is, the CPU 30 waits for reception of the result data.

On the other hand, if "YES" in the step S119, that is, if the predetermined time has elapsed, the game apparatus 12 from which the result data is not transmitted is detected as a disconnected game apparatus 12 in a step S121. In a next step S123, the disconnected game apparatus 12 is notified to the game apparatus 12 of the other player. Then, in a step S125, it is determined whether or not a disconnection notification is issued from the game apparatus 12 of the other player. If "NO" in the step S125, that is, if a disconnection notification is not issued from the game apparatus 12 of the other player, the process returns to the step S125 as it is.

It should be noted that in this embodiment, if a disconnection notification is not issued from the game apparatus 12 of the other player, the process returns to the step S125 as it is. However, if a disconnection notification is not issued even after a predetermined time (10 sec, for example) has elapsed, the game apparatus 12 that is disconnected may be detected accidentally, and therefore, the process may return to the step S107 for receiving the result data again. Or, the game apparatus 12 of the other player may be disconnected, and therefore, the game playing processing may be forcibly terminated.

On the hand, if "YES" in the step S125, that is, if the disconnection notification is issued from the game apparatus 12 of the other player, the game apparatus 12 as a game master that is not disconnected is notified of promotion of the backup node in a step S127 shown in FIG. 20. In a next step S129, a request to decide (perform matching on) the backup node is transmitted to the matching server 16. At this time, the CPU 30 also transmits the identification information of the disconnected game apparatus 12.

Then, in a step S131, it is determined whether or not the terminal list is received. If "NO" in the step S131, that is, if the terminal list is not received, the process returns to the same step S131. On the other hand, if "YES" in the step S131, that is, if the terminal list is received, the terminal list is updated in a step S133, and the process returns to the step S117 shown in FIG. 18. In the step S133, the terminal list indicated by the terminal list data for player 210c is replaced by the received terminal list.

FIG. 21 is a flowchart showing the data saving processing by the CPU 30 of the game apparatus 12 as a player. In response to occurrence of a predetermined event during the game, an input of an instruction by the player during the game, or an end of the game playing processing, the data saving processing is started.

When starting the data saving processing, the CPU 30 of the game apparatus 12 as a player transmits a request to save data to each of the game apparatuses 12 as game masters in a step S151 as shown in FIG. 21. In a next step S153, it is determined whether or not the encoded game data is received from all the game apparatuses 12 as game masters.

If "NO" in the step S153, that is, if the game apparatus 12 as a game master from which the encoded game data is not transmitted exists, the process returns to the step S153 as it is. On the other hand, if "YES" in the step S153, that is, if the encoded game data is received from all the game apparatuses 12 as game masters, the encoded game data being identical is adopted in a step S155, the adopted encoded game data is saved in the flash memory 34 in a step S157, and data saving processing is ended.

It should be noted that in this embodiment if "NO" in the step S153, the same processing in the step S153 is repeated as it is, but there is no need of being restricted thereto. In a case that the encoded game data is not received even after a lapse of a predetermined time, failure of saving data is notified, and the data saving processing may be forcibly terminated. Alternatively, similar to the case of the game playing, if the encoded game data is not received ever after a lapse of a predetermined time, the disconnection of the game apparatus 12 as a game master from which the encoded game data is not transmitted is detected, a backup node is promoted to the game master, and the data saving processing may be continued.

FIG. 22 is a flowchart showing data loading processing by the CPU 30 of the game apparatus 12 as a game master. Here, the description is made on a case that the game apparatus 12 functions as a first game master, but this holds true for a case that the game apparatus 12 functions as a second game master. As to the game playing processing and the data saving processing to be described later as well, the description is made on a case that the game apparatus 12 functions as a first game master.

When receiving a request to load data together with the encoded game data from the game apparatus 12 as a player, the CPU 30 of the game apparatus 12 as a game master starts the data loading processing, and transmits the encoded game data and the request for decoding to the decoding server 18 in a step S171 as shown in FIG. 22.

In a succeeding step S173, it is determined whether or not the game data is received. If "NO" in the step S173, that is, if the game data is not received, the process returns to the same step S173 as it is. On the other hand, if "YES" in the step S173, that is, if the game data is received, the game data is stored in a step S175, and the data loading processing is ended. That is, in the step S175, the CPU 30 stores as game data for first game master 212c the game data stored in the transmitted and received data buffer for first game master 212a provided to the memory area for first game master 212. Here, if the number of game apparatuses 12 as players is two, data loading processing is executed in response to a request from each of the game apparatuses 12 as players.

FIG. 23 is a flowchart showing the game playing processing by the CPU 30 of the game apparatus 12 as a game master. When receiving operation data from all the game apparatuses 12 as players, the CPU 30 of the game apparatus 12 as a game master starts the game playing processing, and executes the game processing in a step S191. At this time, the parameter corresponding to the game data for first game master 212c is used. Then, in a step S193, the result data is transmitted to each of the game apparatuses 12 as players, and the game playing processing is ended.

FIG. 24 is a flowchart showing the promotion processing by the CPU 30 of the game apparatus 12 as a game master. When receiving a promotion notification of the backup node from the game apparatus 12 as a player, the CPU 30 of the game apparatus 12 as a game master starts the promotion processing, and transmits the game data to the game apparatus 12 as a backup node in a step S211. It should be noted that the game data to be transmitted here is a copy of the game data for first game master 212c.

In a next step S213, it is determined whether or not the terminal list is received. If "NO" in the step S213, that is, if the terminal list is not received, the process returns to the same step S213 as it is. On the other hand, if "YES" in the step S213, that is, if the terminal list is received, the terminal list is updated in a step S215, and the promotion processing is ended. In the step S215, the terminal list indicated by the terminal list data for first game master 212b is replaced by the received terminal list.

FIG. 25 is a flowchart showing the data saving processing by the CPU 30 of the game apparatus 12 as a game master. When receiving a request to save data from the game apparatus 12 as a player, the CPU 30 of the game apparatus 12 as a game master starts the data saving processing, and transmits the game data and the request for encoding to the encoding server 20 in a step S231.

In a next step S233, it is determined whether or not the encoded game data is received. If "NO" in the step S233, that is, if the encoded game data is not received, the process returns to the same step S233 as it is. On the other hand, if "YES" in the step S233, that is, if the encoded game data is received, the encoded game data is transmitted to the game apparatus 12 as a player being the source of the request to save data in a step S235, and the data saving processing is ended.

According to the present embodiment, the encoded game data is saved in the game apparatus, and therefore, it is difficult to modify (tamper) the encoded game data so long as the format of the encoding, or the like is not opened. Furthermore, even if the encoded game data is modified, it cannot be decoded by the decoding server. Accordingly, the game processing by using the modified game data is hardly executed. That is, it is possible to prevent an illegal act such as modification of the game data from occurring as much as possible without managing the game data in other devices like a game server.

Furthermore, in this embodiment, a description is made on a case that game apparatuses of two players play the communication game, but there is no need of being restricted thereto. For example, one game apparatus of a single player may solely perform a game (hereinafter, referred to as "local game"). In a case that one game apparatus plays the local game, the processing is the same as that when the communication game is played as shown in FIG. 13 to FIG. 25 except that the matching processing in the matching server and the game processing in the game master are slightly different from each other.

More specifically, the matching server accepts a request for game playing from the game apparatus which is to play the local game in the step S1. On the other hand, the game apparatus requests the matching server to play the local game in response to an operation by the user. Then, the matching server decides this game apparatus as a game apparatus as a player in a step S3. That is, according to the matching processing, one game apparatus as a player, three game apparatuses as game masters and one game apparatus as a backup node are decided, from which a terminal list is created.

Furthermore, in the game playing processing, the CPU of the game apparatus as a game master executes the game processing according to the operation data (input data) transmitted from one game apparatus as a player by using the game data obtained by decoding the encoded game data transmitted from the game apparatus as a player in the step S191 shown in FIG. 23.

Additionally, in this embodiment, the game apparatus as a game master executes the game processing by using the game data according to operation data from the game apparatus as a player, but there is no need of being restricted thereto. The game processing may be executed in other devices (machines such as a game apparatus, or the like, and computers such as a server or the like) that are able to communicate with the game apparatus as a game master. In such a case, the game apparatus as a game master transmits the operation data from the game apparatus as a player and the decoded game data to the other devices, and receives the result data of the game processing from the other devices. Thus, in a case that the game processing is executed in the other devices, the game apparatus as a game master requests the encoding server to encode the game data, transmits the encoded game data received from the encoding server to the game apparatus as a player being a source of the request to save data, transmits the operation data from the game apparatus as a player to the other devices, transmits the result data of the game processing executed in the other devices to the game apparatus as a player as described above, requests the decoding server to decode the encoded game data, and transmits the game data received from the decoding server to the other devices as described above. That is, in a case that the game processing is executed in the other devices, the game apparatus as a game master functions as a device relaying data between the game apparatuses as players, and each of the encoding server, the decoding server and the other devices.

In addition, in this embodiment, in a case that the game apparatus as a player plays the game, the game apparatus as a game master executes the game processing on the basis of the operation data (input data) transmitted from the game apparatus as a player and the game data obtained by decoding the encoded game data transmitted from the game apparatus as a player, but there is no need of being restricted thereto. For example, the game apparatus as a game master may execute the game processing on the basis of the game data obtained by decoding the encoded game data transmitted from the game apparatus as a player. To be more specific, with reference to parameters indicated by the game data obtained by decoding encoded game data transmitted from each of the game apparatuses of a plurality of players, the game apparatus as a game master outputs (displays) ranking with respect to the power of game characters, and displays images of rare game characters and names of the possessors (users).

Additionally, in this embodiment, three game apparatuses are decided as game masters, but the number of game apparatuses as game masters may be one or two. Or, if the game apparatus has a capability, four or more game apparatuses as game masters can be decided. Here, if the number of game apparatuses as game masters is one, each of the game apparatuses as players merely acquires the result data and the encoded game data from the game apparatus as a game master. Furthermore, if the number of game apparatuses as game masters is two, only when the result data and the encoded game data from these game apparatuses as game masters are equal, the game apparatus as a player adopts the result data and the encoded data. In addition, in a case that the number of game apparatuses as game masters is an even number being equal to or more than four, if the number of game apparatuses that are equal in contents of the result data and the game data and that are not equal in contents thereof is the same, the equal one may be adopted or not adopted.

Furthermore, in this embodiment, the description is made only on portable game apparatuses, but this can be applied to other kinds of portable information processing apparatuses having a communication function, such as a notebook PC, a PDA, a cellular phone, or the like. Also, this can be applied to nonportable information processing apparatuses, such as a desktop PC, a console game apparatus, or the like.

In addition, in this embodiment, the matching server, the decoding server and the encoding server are provided separately, but one or two servers having two or more functions may be provided.

Moreover, in this embodiment, encoding of the game data is performed in the encoding server, and decoding of the encoded game data is performed in the decoding server, but encoding and decoding may be performed in game apparatuses as game masters. The game apparatus of the user becomes a game master without noticing of it by the user, and therefore, even if encoding or decoding is performed in this game apparatus, the possibility of an illegal act occurring in the game apparatus becomes low.

While certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A game system including a first game apparatus in communication with a second game apparatus, wherein
the first game apparatus comprises:
a memory;
at least one first communications interface; and
a first processing system including at least one processor, the first processing system configured to:
receive, using the at least one first communication interface, encoded game data comprising game data for playing a game in the first game apparatus encoded by an encoding server different from the first game apparatus and the second game apparatus such that the encoded game data is in a format that cannot be decoded by the first game apparatus and the second game apparatus;
store the encoded game data in the memory; and
use the at least one first communication interface to transmit the encoded game data stored in the memory to the second game apparatus, and wherein
the second game apparatus comprises:
at least one -second communication interface; and
a second processing system including at least one processor, the second processing system configured to, using the at least one second communication interface, (a) receive the encoded game data transmitted by the first game apparatus, (b) transmit the encoded game data received from the first game apparatus to a decoding server different from the first game apparatus and the second game apparatus, and (c) receive decoded game data from the decoding server which is configured to decode the encoded game data transmitted by the second game apparatus, wherein the decoded game data comprises the game data for playing the game in the first game apparatus.

2. A game system according to claim 1, wherein the second processing system is further configured to execute game processing on the basis of the decoded game data received using the second communication interface.

3. A game system according to claim 2, wherein the first processing system is further configured to transmit, using the first communication interface and in response to an input provided to the first game apparatus by a user, input data corresponding to the input to the second game apparatus, and
wherein the second processing system is further configured to execute the game processing on the basis of the input data transmitted by the first processing system and the decoded game data received by the second processing system using the second communication interface.

4. A game system according to claim 2, wherein the second processing system is further configured to
receive, using the second communication interface, encoded game data obtained by encoding the game data which is changed as a result of the game processing executed by the second processing system,
to transmit the encoded game data received by the second processing system to the first game apparatus, and
to store the encoded game data transmitted by the second processing system.

5. A game system according to claim 4, wherein the encoding server is in communication with at least the second game apparatus, and
the second processing system is further configured to transmit using the second communication interface the game data to the encoding server,
wherein the encoding server further comprises a third communication interface and wherein the encoding server is configured to
encode the game data transmitted by the second processing system, and
use the third communication interface to transmit encoded game data encoded by the encoding server to the second game apparatus, and wherein
the second processing system is further configured to receive the encoded game data transmitted by the encoding server using the third communication interface.

6. A game system according to claim 5, further including a second decider comprising a third processing system having at least one processor, wherein the third processing system is configured to decide a group including at least the first game apparatus and the second game apparatus wherein the encoded game data is transmitted by the first communication interface, and
the encoding server is further configured to encode the game data wherein a group including the first game apparatus and the second game apparatus which play the game according to the game data transmitted by the second processing system is decided by the second decider.

7. A game system according to claim 5, further including a plurality of second game apparatuses,
wherein the first processing system is further configured to store in the memory one selected set of encoded game data out of a plurality of sets of encoded game data transmitted by the plurality of second game apparatuses, the plurality of second game apparatuses including the second game apparatus.

8. A game system according to claim 7, further including at least three second game apparatuses including the second game apparatus,
wherein the first processing system is further configured to compare the plurality of sets of the encoded game data transmitted by the plurality of second game apparatuses, and to store in the memory the encoded game data which has a greatest number of identical sets in the plurality of sets of the encoded game data.

9. A game system according to claim 1, wherein the second processing system is further configured to, using the second communication interface, transmit to the decoding server the encoded game data transmitted by the first processing system, wherein
the decoding server is configured to decode the encoded game data transmitted by the second processing system, and
to transmit the game data obtained by decoding the encoded game data to the second game apparatus, and wherein
the second processing system is further configured to receive the decoded game data transmitted by the decoding server.

10. A game system according to claim 9, further including a first decider comprising a third processing system having at least one processor, wherein the third processing system is configured to decide a group including at least the first game apparatus and the second game apparatus wherein the encoded game data is transmitted by the first processing system using the first communication interface, and wherein
the decoding server is further configured to decode the encoded game data wherein a group including the first game apparatus and the second game apparatus which play the game according to game data corresponding to the encoded game data transmitted by the second communication interface is decided by the first decider.

11. A game apparatus in communication with another game apparatus of a same type on a network, the game apparatus comprising:
a memory;
at least one communication interface; and
a processing system including at least one processor, the processing system configured to:
receive, using the at least one communication interface, encoded game data comprising game data for playing a game encoded by an encoding server different from the game apparatus and the other game apparatus such that the encoded game data is in a format that cannot be decoded by the game apparatus and the other game apparatus;
store the encoded game data in the memory;
transmit, using the at least one communication interface, the encoded game data stored in the memory to the other game apparatus;
transmit to the other game apparatus, in response to an input by the user and using the at least one communication interface, input data corresponding to the input; and
transmit to an output device result data of game processing received, using the at least one communication interface, from the other game apparatus which is configured to (a) transmit the encoded game data to a decoding server different from the first game apparatus and the second game apparatus, (b) receive decoded game data from the decoding server, wherein the decoded game data comprises game data for playing the game, and (c) perform said game processing based on the input data and the decoded game data received from a decoding server.

12. A non-transitory computer readable storage medium storing a game program of a game apparatus having a memory storage which stores encoded game data obtained by encoding game data for playing a game, and being configured to communicate with another game apparatus of a same type on a network, the game program causes a computer of the game apparatus to perform operations comprising:
    transmitting the encoded game data stored in the memory storage to the other game apparatus, wherein the encoded game data stored in the memory storage is previously received from the other game apparatus and comprises the game data encoded by an encoding server different from the game apparatus and the other game apparatus such that the encoded game data is in a format that cannot be decoded by the game apparatus and the other game apparatus;
    transmitting, in response to an input by the user, input data corresponding to the input to the other game apparatus; and
    outputting to an output device result data of game processing performed in the other game apparatus based on the input data and decoded game data, wherein the decoded game data comprises the game data for playing the game and is obtained from a decoding server which is different from the game apparatus and the other game apparatus and which is configured to decode the encoded game data.

13. A non-transitory computer readable storage medium according to claim 12, wherein the result data is based upon the game processing by the other game apparatus.

14. A game controlling method of a game apparatus having a memory storage which stores encoded game data obtained by encoding game data for playing a game, and being configured to communicate with another game apparatus of a same type on a network, a computer of the game apparatus performing the method comprising:
    transmitting the encoded game data stored in the memory storage to the other game apparatus, wherein the encoded game data stored in the memory storage is previously received from the other game apparatus and comprises the game data encoded by an encoding server different from the game apparatus and the other game apparatus such that the encoded game data is in a format that cannot be decoded by the game apparatus and the other game apparatus,
    transmitting, in response to an input by the user, input data corresponding to the input to the other game apparatus, and
    outputting to an output device result data of game processing performed in the other game apparatus based on the input data and decoded game data, wherein the decoded game data comprises the game data for playing the game and is obtained from a decoding server which is different from the game apparatus and the other game apparatus and which is configured to decode the encoded game data.

15. A game system in which a first game apparatus, a second game apparatus and a third game apparatus configured to communicate with each other on a network are included, and a communication game is played between the first game apparatus and the second game apparatus, wherein the first game apparatus comprises:
    a first memory;
    at least one first communication interface; and
    a first processing system including at least one processor, the first processing system configured to:
        receive, using the at least one first communication interface, first encoded game data comprising first game data for playing the communication game encoded by an encoding server different from the first game apparatus and the second game apparatus such that the encoded first game data is in a format that cannot be decoded by the first game apparatus and the second game apparatus;
        store the encoded first game data in the first memory; and
        use the at least one first communication interface to transmit the first encoded game data stored in the first memory to the third game apparatus,
    wherein the second game apparatus comprises:
        a second memory;
        at least one second communication interface; and
        a second processing system including at least one processor, the second processing system being configured to:
            receive, using the at least one second communication interface, second encoded game data comprising second game data for playing the communication game encoded by the encoding server such that the encoded second game data is in a format that cannot be decoded by the first game apparatus and the second game apparatus,
            store the encoded second game data in the second memory, and
            use the at least one second communication interface to transmit the second encoded game data stored in the second memory to the third game apparatus,
    wherein the third game apparatus comprises:
        at least one third communication interface; and
        a third processing system including at least one processor, the third processing system configured to:
            use the at least one third communication interface to (a) receive the encoded first game data from the first game apparatus and the encoded second game data from the second game apparatus, (b) transmit the encoded first game data and the encoded second game data to a decoding server different from the first, second and third game apparatuses, and (c) receive decoded first game data and decoded second game data from the decoding server which is configured to decode the encoded first game data and the encoded second game data transmitted by the third processing system using the at least one third communication interface, wherein the decoded first game data comprises the first game data for playing the game on the first game apparatus and the decoded second game data comprises the second game data for playing the game on the second game apparatus;
            execute game processing on the basis of the received first game data and the received second game data; and
            use the at least one third communication interface to transmit result data of the game processing executed by the third processing system to the first game apparatus and the second game apparatus,
    and wherein each of the first processing system and the second processing system is further configured to
        output the result data transmitted by the third processing system to an output device.

16. A game apparatus for game processing, the game apparatus comprising:

a processing system; and at least one wireless communication interface, under the control of the processing system, for:

receiving encoded game data from another game apparatus playing a game, wherein the encoded game data comprises game data encoded by an external encoding server different from the game apparatus and the other game apparatus such that the encoded game data is in a format that cannot be decoded by the game apparatus and the other game apparatus;

transmitting the encoded game data received from the other game apparatus to an external decoding server different from the first game apparatus and the other game apparatus; and receiving decoded game data from the external decoding server which is configured to decode the encoded game data, wherein the decoded game data comprises the game data for playing the game, wherein the processing system performs game processing for the game based, at least in part, on the decoded game data comprising the game data for playing the game, and wherein the at least one wireless communication interface, under the control of the processing system, transmits game processing result data to the other game apparatus for use by the other game apparatus in generating game output.

17. A game system comprising one or more first game apparatuses and one or more second game apparatuses for playing a game, wherein each first game apparatus comprises:

a memory;

a processing system; and at least one wireless communication interface, under the control of the processing system, for:

receiving encoded game data from each second game apparatus playing the game, wherein the encoded game data comprises game data for playing the game encoded by an external encoding server different from the first game apparatuses and the second game apparatuses such that the encoded game data is in a format that cannot be decoded by the first game apparatuses and the second game apparatuses;

transmitting the encoded game data received from each second game apparatus to an external decoding server different from the first game apparatuses and the second game apparatuses; and receiving decoded game data for each second game apparatus from the external decoding server which is configured to decode the encoded game data transmitted by said each first game apparatus, wherein the received decoded game data comprises the game data for playing the game, wherein the processing system of each first game apparatus performs game processing for the game based, at least in part, on the decoded game data for each second game apparatus, and wherein the at least one wireless communication interface of each first game apparatus, under the control of the respective processing system, transmits game processing result data to each second game apparatus for use by the each second game apparatus in generating game output.

* * * * *